United States Patent
Heller et al.

(10) Patent No.: US 6,769,254 B2
(45) Date of Patent: Aug. 3, 2004

(54) HYDRAULIC OPERATING SYSTEMS FOR CLUTCHES AND THE LIKE

(75) Inventors: Jean-Francois Heller, Illkirch-Grafenstad (FR); Urban Panther, Seelbach (DE); Jan Grabenstätter, Gernsbach (DE); Thomas Rammhofer, Sasbach (DE); Roland Welter, Bühl (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 6 days.

(21) Appl. No.: 10/074,601

(22) Filed: Feb. 12, 2002

(65) Prior Publication Data

US 2002/0119055 A1 Aug. 29, 2002

(30) Foreign Application Priority Data

Feb. 12, 2001 (DE) .......................................... 101 06 416

(51) Int. Cl.⁷ ................................................. F15B 7/08
(52) U.S. Cl. ......................................... 60/589; 60/588
(58) Field of Search .................................... 60/588, 589

(56) References Cited

U.S. PATENT DOCUMENTS 2,847,827 A * 8/1958 Johnson ....................... 60/589
4,790,138 A * 12/1988 Steer ........................... 60/589
5,121,686 A * 6/1992 Schonlau et al. ............ 60/588
5,487,704 A    1/1996 Friedmann et al.

FOREIGN PATENT DOCUMENTS

SE            137348      *  9/1952 ................... 60/589

* cited by examiner

Primary Examiner—F. Daniel Lopez
(74) Attorney, Agent, or Firm—Darby & Darby

(57) ABSTRACT

The piston of a master cylinder in the power train of a motor vehicle is made, at least in part, of a thermosetting plastic material and cooperates with one or more annular seals to ensure that a source of hydraulic fluid is communicatively connected with the chamber in the housing of the master cylinder when the piston is moved by one or more springs or otherwise in a sense to increase the volume of the chamber. When a pedal or another actuator causes the piston to expel pressurized fluid from the master cylinder into a slave cylinder, the seal or seals cooperates or cooperate with the housing and/or with the piston of the master cylinder to seal the source from the chamber of the master cylinder. The slave cylinder can actuate the friction clutch between the prime mover and the transmission in the power train of the motor vehicle. The piston of the master cylinder is reciprocable by or with a piston rod by way of a ball and socket joint wherein the ball of the piston rod is held against unintentional extraction from the socket of a connector forming part of or being anchored in the piston.

28 Claims, 5 Drawing Sheets

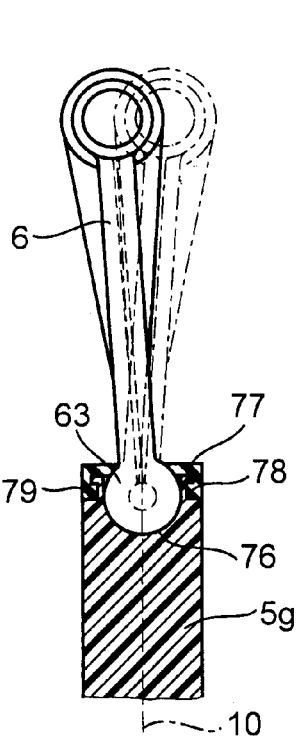
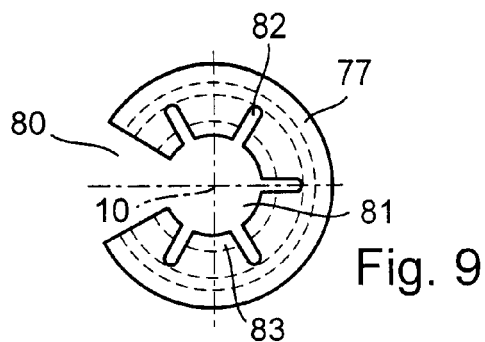
Fig. 9
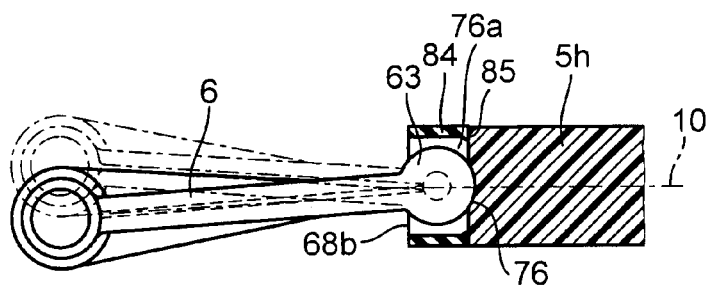
Fig. 10
Fig. 8
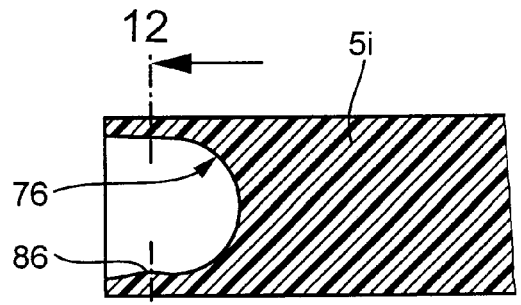
Fig. 11
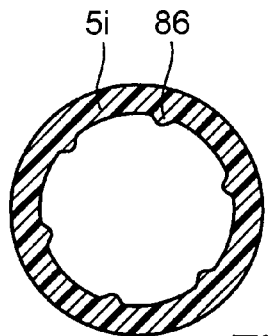
Fig. 12
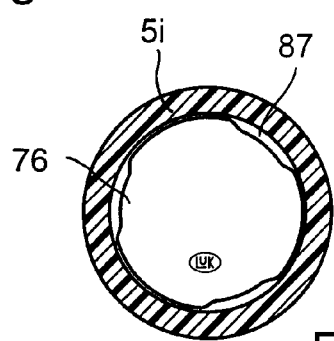
Fig. 13

HYDRAULIC OPERATING SYSTEMS FOR CLUTCHES AND THE LIKE

CROSS-REFERENCE TO RELATED CASES

This application claims the priority of the commonly owned copending German patent application Serial No. 101 06 416.0 filed Feb. 12, 2001. The disclosure of the aforementioned copending German priority application, as well as that of each US and foreign patent and patent application identified in the specification of the present application, is incorporated herein by reference.

BACKGROUND OF THE INVENTION

The present invention relates to improvements in fluid operated systems, especially hydraulic systems, which employ cylinder and piston units. Examples of such units (also called hydraulic or pneumatic cylinders) are so-called slave cylinders and master cylinders which are utilized in the power trains of numerous motor vehicles, e.g., to engage and/or disengage a friction clutch between the prime mover (such as an internal combustion engine) and the change-speed transmission which latter selects the speed and the direction of movement of the vehicle.

As a rule, the piston of the master cylinder of the clutch actuating system in the power train of a motor vehicle is set up to furnish (when necessary or desired) a pressurized fluid to the housing (cylinder) of the slave cylinder by way of one or more conduits, and the piston in the cylinder or housing of the slave cylinder causes a lever, a fork or another suitable actuator or implement to engage or disengage the friction clutch so that the latter establishes or interrupts a torque transmitting connection between the rotary output element (such as a camshaft or a crankshaft) of the prime mover and the rotary input shaft of the transmission.

Published German patent application No. 44 05 581 discloses a master cylinder which employs a one-piece piston having a complex undercut portion for reception of an insert which defines a socket for one (spherical or dome-shaped) end portion of a piston rod. The piston is made of a plastic material by resorting to complex and hence expensive injection molding tools, or of a metallic material in a time-consuming operation by employing material removing implements.

The peripheral surface of the piston in a conventional master or slave cylinder cooperates with the internal surface of the housing to serve as a guide surface for the piston as well as to prevent leakage of hydraulic fluid from the chamber (such as a plenum chamber) of the cylinder. In the absence of a special treatment, the internal surface of the housing and/or the external surface of the piston undergoes pronounced wear after a relatively short period of use with attendant leakage as a result of the development of undesirable clearances and/or due to pronounced wear upon or total destruction of the seal or seals which is or are provided between the housing and the piston.

It is customary to provide a fluid reservoir or tank above or on top of the master cylinder (also called clutch cylinder). Such reservoir contains a supply of brake fluid or another suitable hydraulic fluid which is forced by the piston into the housing of the slave cylinder when the piston of the master cylinder is displaced in its housing in order to change the condition of the friction clutch. As a rule, the housing of the master cylinder is provided with a machined channel, groove or anoter suitable passage to establish a path for the flow of hydraulic fluid between the aforementioned fluid reservoir or tank and the chamber in the housing of the master cylinder when the piston is idle. The passage must be reliably sealed from the surrounding atmosphere during the entire useful life of the master cylinder which involves additional work and contributes to the cost of such hydraulic system.

A further drawback of presently known master cylinder-slave cylinder combinations is that they cannot compensate for the development of subatmospheric pressures in the housing of the master cylinder during retraction of its piston, i.e., such hydraulic systems are incapable of ensuring or of adequately ensuring satisfactory drawing of hydraulic fluid into the chamber which is defined by the housing of the master cylinder and its piston in order to prevent the development of cavitation while the piston is caused to return to its idle or starting position in which the pressure of fluid in the master cylinder assumes its lowest value.

OBJECTS OF THE INVENTION

An object of this invention is to provide a simple, inexpensive and long-lasting fluid-operated system, especially a hydraulic system, which employs at least one cylinder and piston unit and can be utilized with advantage in the power trains of motor vehicles as well as for numerous other purposes.

Another object of our invention is to provide a hydraulic system of the above outlined character which can be assembled and/or otherwise attended to by semiskilled persons.

A further object of the present invention is to provide a novel and improved method of making the piston and/or the housing of the cylinder and piston unit for use in a hydraulic system which is or which can be employed in a power train, e.g., to actuate the friction clutch and/or the brake(s) in the power train of an automobile or another motor vehicle.

An additional object of the instant invention is to provide novel and improved articulate connections between the pistons and piston rods in the cylinder and piston units which can serve as master cylinders or slave cylinders in the power trains of motor vehicles, such as passenger cars, trucks, suburban vehicles and many others.

Still another object of this invention is to provide a master cylinder or a slave cylinder which employs or which can operate properly by employing fewer sealing rings, sealing lips and/or other types of sealing elements than heretofore known cylinders.

A further object of our invention is to provide a master cylinder or a slave cylinder which can reliably draw oil or another hydraulic fluid into the chamber of its housing during each retraction of the piston to or toward its starting position.

Another object of the present invention is to provide a novel and improved method of articulately anchoring the piston rod in the socket of the piston or another part of a hydraulic cylinder and piston unit, for example, in the power train of a motor vehicle.

An additional object of the invention is to provide novel and improved means for mounting one or more seals in the housing of a hydraulic cylinder and piston unit of the above outlined character.

Still another object of the instant invention is to provide a novel and improved piston for use in a hydraulic cylinder and piston unit.

A further object of the invention is to provide a novel and improved housing or cylinder for use in a hydraulic cylinder and piston unit, particularly in the power train of a passenger car or another combustion engine-driven or otherwise power-driven conveyance.

Another object of the invention is to provide a novel and improved method of reducing the extent of wear upon and of prolonging the useful life of the piston and/or housing and/or sealing means and/or other constituents of hydraulic cylinder and piston units.

An additional object of the invention is to provide a novel and improved method of constructing, configurating and assembling the constituents of a master cylinder or a slave cylinder in such a way that they are automatically locked to each other as soon as they are properly positioned relative to one another.

Still another object of our invention is to construct the constituents of a master cylinder, a slave cylinder or another fluid-operated or fluid conveying and/or compressing cylinder and piston unit in such a way that they are automatically limited or confined to requisite (permissible) movements with and/or relative to each other as soon as their assembly with one another and/or with one or more additional constituents is completed.

An additional object of our instant invention is to provide a power train, particularly for use in motor vehicles, which embodies one or more master cylinders and/or slave cylinders with pistons, piston rods, seals and other constituents of the above outlined character.

A further object of this invention is to prolong the useful lives of cylinder and piston units in a simple and inexpensive manner, by resorting to available equipment and by employing readily available and relatively inexpensive materials.

SUMMARY OF THE INVENTION

One of several features of the present invention resides in the provision of a hydraulic system which comprises a first cylinder and piston unit including a first fluid-containing housing and a first piston which is reciprocable in such housing, and a second cylinder and piston unit including a second fluid-containing housing and a second piston which is reciprocable in the second housing. At least one of the pistons consists at least in part of a thermosetting material, and the improved hydraulic system further comprises at least one fluid-conveying conduit which connects the first housing with the second housing.

The first unit can constitute the master cylinder and the second unit can constitute the slave cylinder of a power train in a motor vehicle wherein the slave cylinder serves to actuate a clutch, such as a friction clutch. Such hydraulic system can further comprise means for varying the pressure of hydraulic fluid in the first housing by way of the first piston; the pressure varying means can comprise a clutch pedal and a piston rod which articulately connects the pedal with the first piston, preferably by way of a novel ball and socket joint.

The at least one piston can constitute a shaped article, e.g., a product which is turned out in accordance with a pressing, an injection pressing, an injection molding or an analogous technique.

Suitable thermosetting materials for the making of the at least one piston include melamine, phenolic resins, epoxy resins, unsaturated polyesters, silicon resins, urea and formaldehyde.

The at least one piston can be reinforced, for example, by glass fibers.

An external surface of the at least one piston can be guided by an internal surface of the respective housing, and the hydraulic system can further comprise at least one sealing element, such as a ring-shaped seal, which is in sealing engagement with the surface of the at least one piston.

The at least one piston and the respective housing define a variable-volume chamber for hydraulic fluid, and such system further comprises at least one seal which is interposed between the at least one piston and the respective housing. Such housing preferably includes a one-piece section which cooperates with the at least one piston to define the variable-volume chamber.

Another feature of the present invention resides in the provision of a variable-condition hydraulic system which comprises a master cylinder including a first housing and a first piston which is reciprocable in and defines with a section of such housing a first fluid-containing chamber, a slave cylinder including a second housing and a second piston which is reciprocable in and defines with the second housing a second fluid-containing chamber, at least one hydraulic connection between the two chambers (such connection can include two conduits and a throttle valve between them), a source of hydraulic fluid (e.g., brake fluid), at least one conduit which serves to connect the source with the first chamber, and a seal which is interposed between the first piston and the section of the first housing. The seal is movable within limits relative to the first piston between a plurality of positions in dependency upon the condition of the hydraulic system.

The seal is or can be arranged to establish communication between the at least one conduit and the first chamber in at least one predetermined position of the seal relative to the first piston. Such seal can be arranged to move to the at least one predetermined position as a result of frictional engagement with the first piston, and the first piston is movable relative to the section of the first housing through a predetermined distance from an end position; the at least one seal is or can be arranged to share a predetermined stage of movement of the first piston.

The arrangement can be such that the seal is movable relative to the first piston in response to changes of fluid pressure in the first chamber.

The seal can be arranged to establish with the first piston and/or with the first housing at least one path for the flow of fluid between the at least one conduit and the first chamber in at least one of the aforementioned plurality of positions of the seal relative to the first piston.

The seal has a first surface which is in at least temporary sealing engagement with an end face of the first piston, and a second surface which is in at least temporary sealing engagement with an internal surface of the first housing. The first surface of the seal can be provided with at least one annular projection or bead which is movable into and from sealing engagement with the end face of the first piston.

The improved hydraulic system can further comprise a control ring which is movably interposed between the first piston and the first housing; the seal in such system can include a first annular projection (e.g., a bead) which serves to sealingly engage an annular end face of the first piston, and a second annular projection (e.g., a second bead) which surrounds the first annular projection and serves to sealingly engage an end face of the control ring.

The first piston is or can be reciprocable in the section of the first housing to increase and reduce the pressure of fluid in the first chamber, and the seal can be arranged to seal the first chamber from the at least one conduit in response to an increase of fluid pressure in the first chamber. Such seal can be further arranged to intensify the sealing action between the at least one conduit and the first chamber in response to increasing fluid pressure in the first chamber. This seal can be installed for movement relative to the first piston in response to movement of the first piston in a direction to reduce the fluid pressure in the first chamber.

The first piston can be provided with an axial extension (such as a tubular extension), and the seal can constitute a ring which is axially movably mounted on the extension. Such master cylinder can further include a carriage (such as a sleeve-like part) which is surrounded by and is arranged to share the movements of the seal. The carriage can be installed to axially movably surround the extension of the first piston. Such extension can be provided with a radially outwardly extending stop which serves to limit the extent of movability of the carriage relative to the first piston. The carriage can be mounted on the extension of the first piston as a result of movement over the stop of the extension, and the stop can be provided with a substantially conical surface or slope which serves to facilitate rapid and convenient mounting of the carriage on the extension. To this end, the tubular extension can be provided with at least one elongated slot to permit radial contraction during mounting of the carriage on the extension. In addition to or in lieu of such slot in the extension, the tubular carriage can be provided with a slot which is arranged to permit radial expansion of the carriage during mounting on the extension.

An open end of the at least one conduit can serve as an inlet or as an outlet for hydraulic fluid and is located at the aforementioned section of the first housing. The seal can be arranged to directly seal the open end of the at least one conduit in at least one of the aforementioned plurality of its positions.

Still further, the hydraulic system can be operated in such a way that the first piston (i.e., the piston of the master cylinder) is movable relative to the aforementioned section of the first housing to an idle position in which the source of hydraulic fluid communicates with the first chamber by way of the at least one conduit. The section of the first housing can be provided with at least one channel which establishes at least a portion of a path for the flow of fluid between the at least one conduit and the first chamber in an end position of the seal and while the first piston is idle. The at least one channel can include at least one groove provided in an internal surface of the aforementioned section of the first housing. Such hydraulic system can further include a control ring which is axially movably interposed between the first piston and the first housing and has at least one opening defining a second portion of the path in a predetermined axial position of the control ring relative to the aforementioned section of the first housing. Such hydraulic system can further comprise a stop which is provided in the first housing and serves to arrest the control ring in the predetermined axial position relative to the section of the first housing.

The seal can be arranged to normally seal the at least one conduit from the first chamber and to establish a path for the flow of fluid between the at least one conduit and the first chamber in response to movement to at least one of a plurality of positions. The seal is movable, at least in part, by the first piston and assumes the at least one position in response to assumption by the first piston of an end position relative to the first housing.

At least a portion of the at least one piston can consist, at least in part, of a thermosetting plastic material.

The hydraulic system further comprises means (such as a pivotable pedal and a piston rod) for reciprocating one of the pistons relative to the respective housing, and such reciprocating means can include a ball and socket joint.

A further feature of the present invention resides in the provision of a ball and socket joint, e.g., to move the piston of the master cylinder in the power train of a motor vehicle relative to the housing of such master cylinder. The improved ball and socket joint comprises a reciprocable piston, a connector provided on the piston and having a socket, a piston rod having an at least substantially spherical head received in the socket with freedom of swivelling movement, and means for securing the connector to the piston. In accordance with a feature of the invention, the spherical head is disposed between an elongated portion (such as a shank) of the piston rod and the securing means.

The piston can be provided with a stepped axial hole and the connector can include a portion extending into such hole. The securing means of such joint can include means for anchoring the aforementioned portion of the connector in the hole. Such portion of the connector can include a plug and the anchoring means can include a form-locking connection between the plug and the piston; such form-locking connection can include one or more snap fasteners. Alternatively, the anchoring means can include a force-locking connection between the plug and the piston, and such force-locking connection can include the establishment of a force fit between the plug and the piston.

The securing means can include mating threads on the plug of the connector and in the piston.

It is also possible to employ securing means which consists of or includes an undercut provided on the connector or on the piston rod and a complementary part provided on the piston rod or connector and received in the undercut. The connector can be slotted in the region of the undercut. Alternatively, the connector can include a radially expandible elastic portion which is disposed in the region of the undercut and is non-expandibly surrounded by the piston or by the housing or cylinder for the piston.

The connector can include an annular array of radially outwardly expandible segments which surround the socket, and a ring-shaped retainer which surrounds the segments. Such connector can be a separately produced part or it can be of one piece with the piston.

If the connector is part of the piston, the securing means can include an undercut provided on the piston or on the piston rod and a complementary part which is received in the undercut and is provided on the piston rod or on the piston. The complementary part can include one or more protuberances which are or which can be provided on the piston. At least a portion of such piston can consist of a thermosetting material.

Still another feature of the present invention resides in the provision of a ball and socket joint which comprises a piston including an end portion having a concave socket, a piston rod having a spherical head in the socket, and a connector including a cover overlying the end portion of the piston, surrounding the piston rod adjacent the head, and being affixed to the piston. The cover can include a radially extending substantially wedge-shaped recess and a central opening receiving the piston rod adjacent the head and communicating with the recess. The opening is or can be at least substantially round and the narrowest portion of the radial recess preferably exhibits a width which is less than the diameter of the central opening. At least a portion of the piston can consist of a thermosetting material, e.g., of one of the afore-enumerated thermosetting materials.

An additional feature of our present invention resides in the provision of a cylinder and piston unit, such as the master cylinder or the slave cylinder in the power train of a motor vehicle. Such cylinders can be utilized to actuate the brake (s) or to actuate (such as disengage) the friction clutch between the prime mover and the change-speed transmission of the motor vehicle. The improved cylinder and piston unit comprises a housing (e.g., a housing including two sections which are sealingly fitted into each other), and a piston in the housing. The housing is reciprocable relative to the piston and/or vice versa and the housing and/or the piston can be made, at least in part, of a thermosetting plastic material. Such cylinder and piston unit normally further comprises one or more seals (such as annular seal or seals) which is or are sealingly interposed between the housing and the piston. The seal or seals can perform several tasks, such as sealing the internal chamber of the housing from the surrounding atmosphere as well as of regulating the flow of hydraulic fluid between one or more sources and the internal chamber or chambers of the housing.

The novel features which are considered as characteristic of the invention are set forth in particular in the appended claims. The improved hydraulic system itself, however, both as to its construction and the modes of assembling and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 8 is a schematic partly elevational and partly axial sectional view of a further connector between the spherical or domed head of the piston rod and the socketed end portion of the piston in a cylinder and piston unit, e.g., in the master cylinder of a hydraulic system of the type shown in FIG. 1;

FIG. 9 is an enlarged plan view of the connector in the structure shown in FIG. 8;

FIG. 10 is a view similar to that of FIG. 8 but showing a different connector between the piston and the piston rod of a hydraulic cylinder and piston unit for use in the power train of a motor vehicle or the like;

FIG. 11 is a fragmentary axial sectional view of a further piston which can be utilized in the cylinder and piston unit of the present invention;

FIG. 12 is an enlarged sectional view of the piston as seen in the direction of arrows from the line XII—XII of FIG. 11; and FIG. 13 is an end elevational view of a piston constituting a modification of the piston shown in FIGS. 11 and 12.

DESCRIPTION OF PREFERRED EMBODIMENTS

Figure 1:
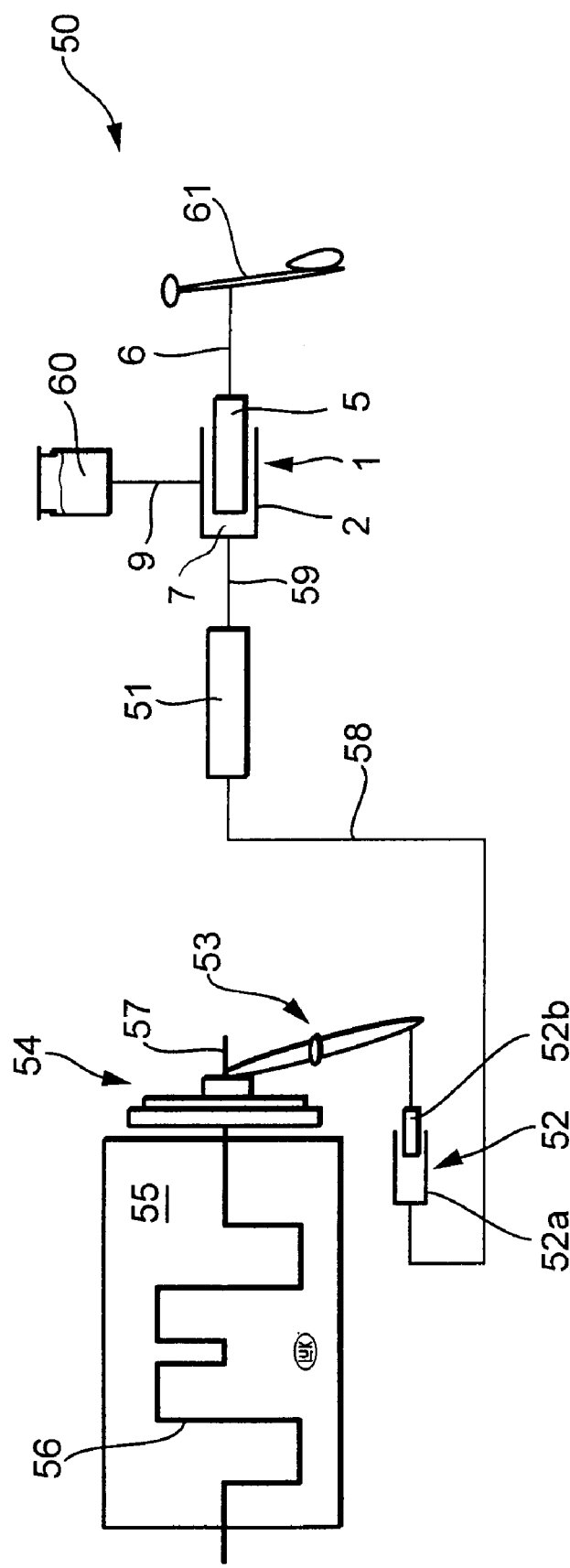
FIG. 1 is a schematic elevational view of a power train embodying two hydraulic cylinder and piston units at least one of which can be constructed, assembled and operated in accordance with the present invention.

FIG. 1 shows certain relevant details of a hydraulic mechanism or system 50 which can be put to use to operate a friction clutch 54 between the rotary output element 56 (such as a crankshaft) of a prime mover 55 (e.g., an internal combustion engine) and the input shaft 57 of a change-speed transmission in the power train of a motor vehicle. The means for actually operating (such as disengaging) the clutch 54 includes a lever 53 which is pivotable by an axially reciprocable piston 52b installed in the housing or cylinder 52a of a slave cylinder unit 52 forming part of the hydraulic system 50. The latter further includes a pivotable pedal 61 (which can be replaced by the actuator of an electronic control unit, not shown, or by any other suitable actuating means) serving to move the piston rod 6 of a master cylinder 1. The latter further includes an axially reciprocable piston 5 which is articulately connected to the piston rod 6 (e.g., in a manner which will be described in greater detail with reference to FIG. 5) and is reciprocable in a housing or cylinder 2 connected to the housing 52a of the slave cylinder 52 by a first conduit 59, a flow restrictor 51 (e.g., a throttle valve) and a second conduit 58. FIG. 1 further shows a source 60 of hydraulic fluid (e.g., a reservoir or tank) and a fluid replenishing conduit 9 connecting the source 60 with the housing 2 of the master cylinder 1.

The conduits 58, 59 can be replaced with a single conduit if the flow restrictor 51 is installed in (e.g., integrated into) the master cylinder 1, in the slave cylinder 52 or (if provided) in a peak torque limiter.

The system 50 can operate or actuate the friction clutch 54 hydraulically by causing the piston 5 to move in a direction to the left (as viewed in FIG. 1) in response to clockwise pivoting of the clutch pedal 61; this causes the master cylinder 1 to move the piston 52b of the slave cylinder 52 in a sense to pivot the lever 53 to actuate (such as disengage) the friction clutch 54, i.e., to interrupt the torque transmitting connection between the crankshaft 56 of the engine 55 and the input shaft 57 of the change-speed transmission. The operator of the motor vehicle is then free to shift the transmission into a different gear. The manner in which a friction clutch can establish or interrupt a torque transmitting connection between the rotary output element of a prime mover and the rotary input element of a manually shiftable, automated or automatic transmission is disclosed, for example, in commonly owned U.S. Pat. No. 5,487,704 granted Jan. 30, 1996 to Friedmann et al. for "APPARATUS FOR DAMPING VIBRATIONS".

When the pedal 61 displaces the piston rod 6, the piston 5 of the master cylinder 1 is caused to raise the pressure of hydraulic fluid which fills the chamber 7 of the housing 2 in front of the piston 5 and which raises (via conduits 59, 58 and valve 51) the pressure of fluid in the chamber of the housing 52a. The piston 52b of the slave cylinder 52 then causes the lever 53 to disengage the friction clutch 54, either directly or through a suitable standard release bearing (not shown). As a rule, the lever 53 or the release bearing causes or permits a suitable spring (such as a diaphragm spring of the type shown in the aforementioned U.S. Pat. No. 5,487,704 to Friedman et al.) to displace a pressure plate of the friction clutch 54 with the result that the crankshaft no longer transmits torque to the input shaft 57 of the change-speed transmission.

The lever 53 can be omitted if the piston 52b is replaced with an annular piston which is coaxial with and surrounds the input shaft 53 of the change-speed transmission and which can engage and displace the tongues of the diaphragm spring in the housing of the friction clutch 54 or an equivalent clutch, either directly or by way of a suitable release bearing.

The housing 52a of the slave cylinder 52 can be rigidly secured to the case (not shown) of the transmission which includes the input shaft 57; this ensures that the slave cylinder can generate the force which is necessary to change the condition of (e.g., to disengage) the friction clutch 54. It is equally possible to mount the housing 52a on another fixed part of the power train of the motor vehicle. When the clutch 54 is at least partly engaged, the crankshaft 56 drives the input shaft 57 which transmits torque to the wheels of the motor vehicle, e.g., by way of a differential and two axles.

The purpose of the fluid source 60 and of the conduit 9 is to compensate for losses of hydraulic fluid and/or for volumetric changes of such fluid in the hydraulic system 50, e.g., for those losses and/or volumetric changes which develop as a result of wear upon the friction linings of the clutch disc or friction disc forming part of the clutch 56 (reference may be had again to U.S. Pat. No. 5,487,704 to Friedmann et al.). The wear upon the friction linings causes a change in the orientation of the diaphragm spring which reacts against the housing and bears upon the axially movable pressure plate of the clutch, and such change of orientation (tilting) of the diaphragm spring results in a change of axial position of the piston 52b in the slave cylinder 52. The manner in which the parts 60 and 9 can compensate for wear upon the friction linings of the clutch disc in the friction clutch 54 will be described in greater detail with reference to FIGS. 2 to 4. The mounting of the source 60 relative to the housing 2 of the master cylinder 1 is or can be such that the conduit 9 delivers (when necessary) hydraulic fluid to the housing 2 by gravity flow. Otherwise stated, the source 60 is arranged to store a supply of hydraulic fluid at atmospheric pressure because it is mounted hydrostatically with reference to (i.e., above) the chamber 7 in the housing 2 of the master cylinder 1.

Figure 2:
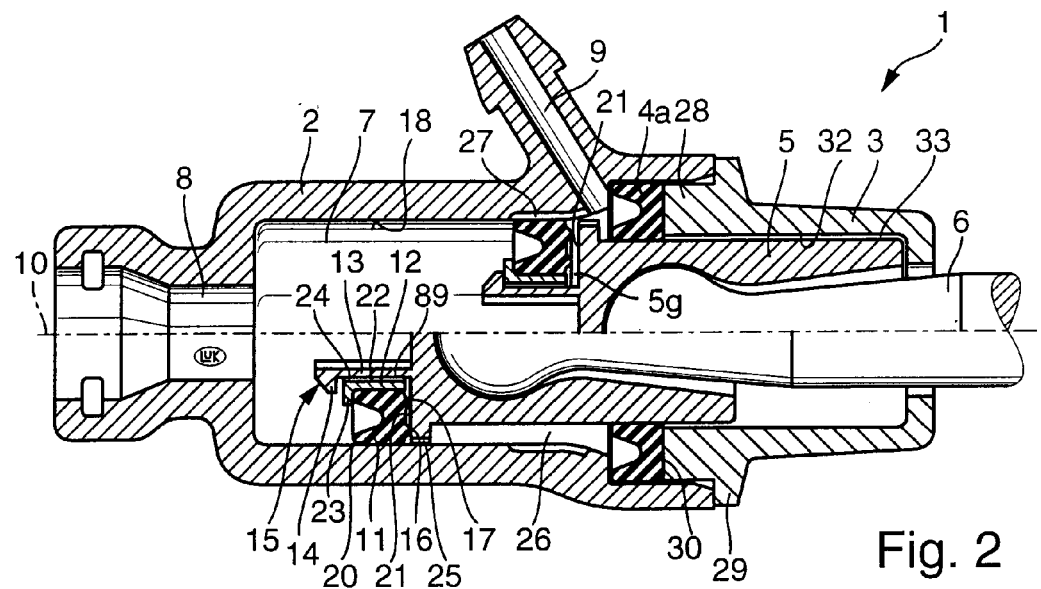
FIG. 2 is an axial sectional view of a master cylinder which can constitute one of the two units in the power train shown in FIG. 1, the upper half of FIG. 2 showing the reciprocable piston of the master cylinder in one end position with reference to the housing of the master cylinder and the lower half of this Figure showing the piston in or close to the other end position.
Figure 3:
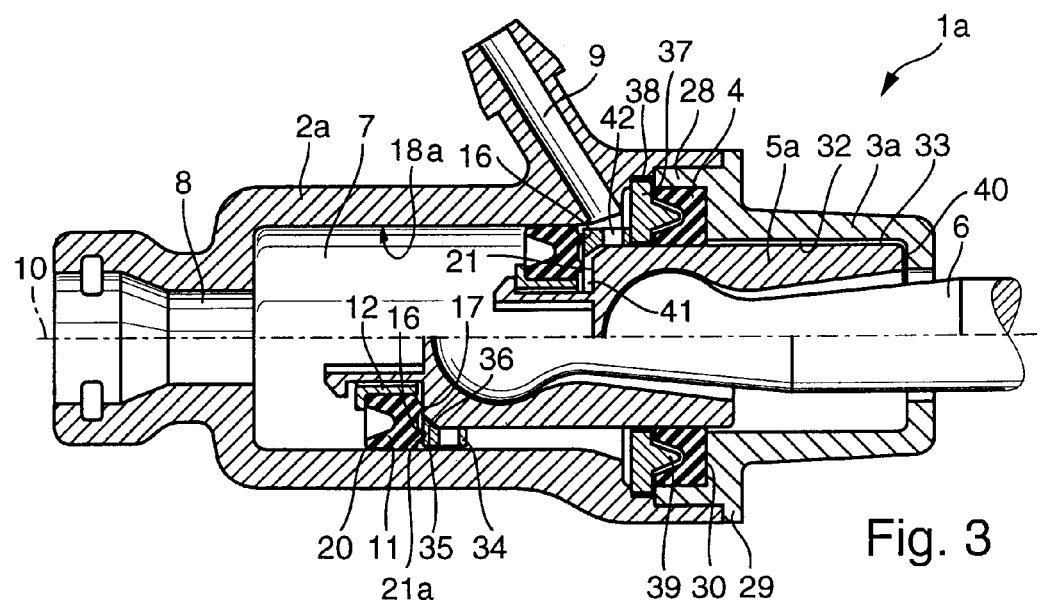
FIG. 3 is a view similar to that of FIG. 2 but showing certain relevant features of a modified master cylinder.
Figure 4:
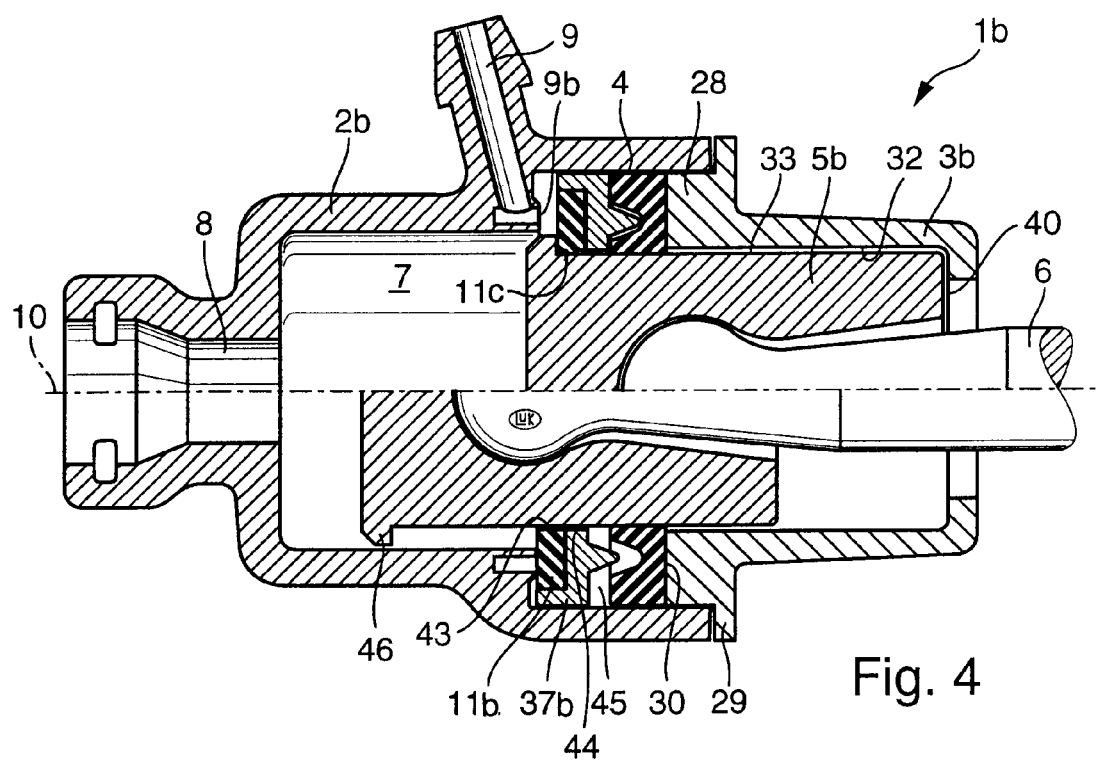
FIG. 4 is a view similar to that of FIG. 2 or 3 but showing certain relevant details of a third master cylinder.

FIGS. 2, 3 and 4 illustrate three embodiments of the master cylinder which are respectively denoted by the reference characters 1, 1a and 1b. Analogously, those parts of the master cylinder 1a which are different from the corresponding parts of the master cylinder 1 are often denoted by similar reference characters each followed by the letter "a". Furthermore, those parts of the master cylinder 1b shown in FIG. 4 which are different from the corresponding parts of the master cylinder 1a are denoted by similar reference characters each followed by the letter "b". For example, the piston of the master cylinder 1a is denoted by the character 5a, and the piston of the master cylinder 1b is denoted by the character 5b.

Referring to FIG. 2, the character 10 denotes the common axis of the composite housing 2, 3 of the master cylinder 1 and of the piston 5 as well as the directions of reciprocatory movement of the piston 5 relative to such housing. It is to be noted here that the upper half of FIG. 2 shows the piston 5 in the fully retracted axial position whereas the lower half of this Figure illustrates the piston 5 in the fully or at least partly extended position. This also applies for the upper and lower halves of FIGS. 3 and 4.

In accordance with a feature of the present invention, the pistons 5, 5a and 5b are made, at least in part, of a plastic material, preferably a thermosetting plastic material (also known as duroplastic material). One presently preferred method of making the pistons 5, 5a and 5b is by resorting to an injection molding technique.

The interfitted sections 2, 3 of the composite housing of the master cylinder 1 shown in FIG. 2 are preferably made (at least in part) of a plastic material, e.g., in an injection molding machine, not shown. The housing including the sections 2 and 3 receives the piston 5 in such a way that the ring-shaped seal 11 borne by the fluid-contacting front end portion of the piston is in direct sealing engagement with the internal surface 18 of the housing section 2. The latter preferably consists of a single piece of plastic material. The section 3 of the composite housing 2, 3 of the master cylinder 1 has a coaxial annular extension 28 projecting beyond an external collar 29 of the section 3 and received in the adjacent rear end portion of the section 2 so that the front end face 30 of the extension 28 sealingly engages the adjacent surface of a second annular seal 4 in the rear end portion of the housing section 2. The collar 29 serves as a stop which determines the extent of penetration of the end portion or extension 28 into the section 2 and the extent of compression of the seal 4. The extension 28 can be fixed to the housing section 2, e.g., by ultrasonic welding, by screws, by bolts or by analogous fasteners (not shown), by resorting to an adhesive and/or by snap action. All that counts is that the sections 2, 3 be secured to each other against axial as well as against angular movement with respect to one another.

The cylindrical internal surface 32 of the housing section 3 serves as a guide for the cylindrical external surface 33 of the piston 5 of the master cylinder 1. The external surface 33 is also in sealing engagement with the internal surface of the annular seal 4.

It has been ascertained that, instead of making the piston 5 (as well as the pistons 5a and 5b) of a thermoplastic material, it is particularly advantageous to make such piston of a thermosetting material because this greatly reduces the wear upon the piston along its external surface 33. This not only enhances the sealing engagement between the surface 33 and the internal surface of the annular seal 4 but also the accuracy of guidance of the piston 5 along the internal surface 32 of the housing section 3. Thus, by making the piston 5 (or at least that portion of this piston which is adjacent the suface 33) of a thermosetting material, one can enhance the sealing action between the surface 33 and the annular seal 4 as well as the sealing action between the external surface 33 and the internal surface 32. Moreover, such dual sealing action (between 4 and 5 as well as between 3 and 5) remains intact or satisfactory for long periods of time.

The thermosetting material for the making of a piston 5, 5a or 5b must satisfy the requirements regarding the characteristics of pistons in the housings of master cylinders for use in the power trains of motor vehicles, such as in the motion transmitting connection between a clutch pedal and a friction clutch or between a brake pedal and a set of brakes in a motor vehicle. Thus, the piston 5 must stand changes of temperature within a certain range, it must be capable of withstanding rather pronounced mechanical stresses as well as the chemical influence (if any) of hydraulic fluid in the chamber 7 of the housing section 2. It has been found that a thermosetting plastic material known as G920 (sold by the German Firm Vincolyt) is particularly suitable for the making of pistons 5, 5a and 5b, not only because it exhibits the above outlined desirable characteristics but also because it can be shaped in injection molding machines. However, it is to be understood that G920 is but one of several thermosetting materials which can be utilized for the making of satisfactory pistons 5, 5a and 5b. It is further to be understood that the making of pistons in master and/or slave cylinders of the character shown in FIG. 1 is not limited to pistons for use in such cylinders but is of advantage under many or all circumstances when it is desirable to utilize wear-resistant and/or otherwise (such as chemically and/or thermally) resistant pistons in hydraulic systems employing cylinder-piston units for actuation of friction clutches in the power trains of motor vehicles and/or elsewhere. As already mentioned hereinbefore, the improved piston can be put to use in many types of hydraulic systems including those which employ master cylinders and/or slave cylinders.

When the piston rod 6 is caused to move the piston 5 in the composite housing 2, 3 of the master cylinder 1 in a direction to the left, as viewed in FIG. 2, this entails a reduction of the volume (capacity) of the chamber 7 in the section 2 in front of the piston 5. The piston 5 expels a predetermined quantity of hydraulic fluid through the outlet 8 of the section 2 and through the conduits 59, 58 of FIG. 1 into the housing 52a of the slave cylinder 52 in order to displace the piston 52b. Such displacement can be carried out with a requisite high degree of accuracy if the hydraulic fluid is prevented from leaving the chamber 7 in a direction other than via outlet 8, i.e., into the conduit 9 wherein the pressure matches or approximates atmospheric pressure, the same as in the (conventional) source 60.

On the other hand, the chamber 7 should be free to communicate with the source 60 via conduit 9 when the piston 5 assumes the retracted position shown in the upper half of FIG. 2. Furthermore, the chamber 7 should communicate with the source 60 (via conduit 9) at least during a certain stage of retraction of the piston 5 to the end position shown in the upper half of FIG. 2 in order to prevent the pressure in the chamber 7 from dropping below atmospheric pressure.

In the master cylinder 1 of FIG. 2, the annular seal 11 bears upon the internal surface 18 of the housing section 2 and shares certain axial movements of the piston 5. To this end, the seal 11 is mounted on a carriage 12 which surrounds and is slidable in the direction of the axis 10 along an axial forward extension 13 of the piston 5 in the chamber 7. The front end of the extension 13 is provided with an external border or rim 14 which serves as a stop against further forward movement of the carriage 12 and seal 11 relative to the extension 13. The latter can constitute a one-piece cylinder or can comprise an annular array of axially parallel prongs which are surrounded by the carriage 12. The slots between neighboring prongs of the extension 13 can be sufficiently wide to permit a reduction of the outer diameter of the rim 14 so that the carriage 12 can be slipped (e.g., by snap action) onto or off the prongs.

Alternatively, if the extension 13 is to constitute a circumferentially complete cylinder, the cylindrical carriage 12 can be replaced with a sleeve which is provided with an axially parallel slit so that it can be expanded for the purpose of mounting it on the circumferentially complete cylindrical extension 13 and is thereupon released to engage the extension by snap action.

In order to facilitate the mounting of the carriage 12 on the extension 13, the rim 14 is preferably provided with a frustoconical external surface 15; such surface can serve its purpose if the carriage 12 is a split sleeve and/or if the extension 13 includes several prongs and/or if the parts 12, 13 are circumferentially complete cylinders but at least one thereof can yield during slipping of the part 12 onto and around the part 13.

The right-hand (rear) end face of the seal 11 is provided with two annular projections or beads 16, 17 the latter of which is surrounded by the former and each of which abuts an annular front end face or platform 21 of the piston 5 when the latter assumes the front end position shown in the lower half of FIG. 2. The projections 16, 17 are spaced apart from the front end face or platform 21 when the piston 5 assumes the retracted position shown in the upper half of FIG. 2; the rear end face of the seal 11 and the front end face 21 then define an annular gap 5G. The peripheral surface of the seal 11 engages the internal surface 18 of the housing section 2 at least in the front end position of the piston 5. The just described sealing action between the piston 5, the seal 11 and the housing section 2 departs from conventional sealing modes according to which an annular seal has a peripheral sealing surface and an annular internal sealing surface.

The internal surface of the seal 11 is in frictional engagement with or is glued or otherwise microscopically or macroscopically bonded to the peripheral surface of the slidable carriage 12 so that it shares all axial movements of the carriage relative to the extension 13 of the piston 5. It is also possible to provide the internal surface of the seal 11 and the peripheral surface of the carriage 12 with complementary grooves and rings, with protuberances and recesses and/or with other formations which guarantee that the seal 11 shares the axial movements of the carriage 12 relative to the extension 13 of the piston 5.

The advantages of the just described mounting of the seal 11 on the carriage 12 and of such carriage on the extension 13 involve the development of a so-called friction-regulated anticavitation function which can be explained as follows: When the piston 5 is caused to pressurize the hydraulic fluid in the chamber 7, an annular lip 20 at the front axial end of the seal 11 is in sealing engagement with the internal surface 18 of the housing section 2. At the same time, the annular projections or beads 16, 17 are in sealing engagement with the front end face 21 of the piston 5. If the piston 5 is thereupon retracted toward the rear end position shown in the upper half of FIG. 2, the pressure in the chamber 7 decreases. If the piston 5 continues to move toward its retracted position, the seal 11 remains idle due to frictional engagement between the lip 20 and the internal surface 18 of the housing section 2 as well as due to frictional engagement between the external surface 89 of the axial extension 13 and the internal surface 22 of the carriage 12. In other words, the piston 5 moves rearwardly relative to the seal 11 and carriage 12.

The just described rearward movement of the piston 5 relative to the seal 11 and carriage 12 is terminated when the rim 14 reaches the lip 20 at the front end of the carriage 12, i.e., when the rear end face of the seal 11 and the front end face 21 of the piston establish the gap 5G. The frictional engagement between the internal surface 18 and the lip 20 on the one hand, and the surfaces 89, 22 on the other hand, is selected in such a way that the friction between the lip 20 and the internal surface 18 exceeds that between the carriage 12 and the extension 13. This ensures that friction-induced shifting of the seal 11 relative to the piston 5 causes a disengagement of the beads 16, 17 from the front end face 21, i.e., the establishment of the gap 5G. Consequently, the source 60 can supply fluid to the chamber 7 via conduit 9. The fluid flowing from the conduit 9 into the chamber 7 can flow through a clearance or gap 24 between the external surface of the piston extension 13 and the internal surface of the carriage 12; this clearance communicates with the annular gap 5G. At such time, the chamber 7 can communicate with an annular compartment 26 between the piston 5 and the section 2 by way of one or more clearances 25 (e.g., by way of an annular array of spaced-apart clearances 25. The compartment 26 communicates with the interior of the conduit 9 (i.e., with the source 60) and with the chamber 7 (via gaps or clearances 24 and 5G).

It is clear that the master cylinder 1 of FIG. 2 can be provided with additional paths for the flow of hydraulic fluid between the source 60 and the chamber 7. For example, at least one clearance or gap can be provided between the carriage 12 and the seal 11. The contact surfaces between the parts 11 and 12 can be axially profiled in such a way that they establish one or more paths for the flow of fluid. Alternatively, the seal 11 can be provided with a passage radially inwardly of the bead 17.

The just described friction-controlled suction-operated fluid replenishing arrangement is of particular advantage when the pressure in the chamber 7 drops below atmospheric pressure because such subatmospheric pressure further assists the friction-controlled termination of the axial sealing action between the part 11 and the front end face 21 of the piston 5. The axial sealing action between the seal 11 and the piston 5 (for the purpose of sealing the chamber 7 from the compartment-26) automatically increases as a function of pressure in the chamber 7.

When the piston 5 is idle, the pressure in the hydraulic system 50 of FIG. 1 should not rise beyond a certain value, e.g., as a result of wear upon the aforementioned friction linings of the clutch disc forming part of the friction clutch 54 and being mounted on the input shaft 57 to transmit torque between the shafts 56 and 57 when the clutch 54 is at least partly engaged. To this end, the chamber 7 is communicatively connected with the source 60 (wherein the fluid pressure normally matches or approximates atmospheric pressure) by way of the conduit 9. This is achieved by the provision, in the region of the seal 11, of at least one but preferably two or more circumferentially spaced apart longitudinal grooves 27 which are machined into or otherwise provided in the internal surface 18 of the housing section 2. The groove or grooves 27 can be provided in the surface 18 during making of the section 2, e.g., in an injection molding machine.

The rim 14 of the extension 13 of the piston 5 serves as a stop for the collar 23 of the carriage 12 as well as to push the carriage 12 and the seal 11 to to the right during movement of the piston 5 from its extended position to the retracted position shown in the upper part of FIG. 2.

All such parts of the master cylinder 1a of FIG. 3 which are identical with or plainly analogous to the corresponding parts of the master cylinder 1 of FIG. 2 are denoted by similar reference characters and will be described only to the extent necessary for a full understanding of the construction and mode of operation of the cylinder 1a. One of the differences between the cylinders 1 and 1a is that the latter includes a control ring 34 whic is adjacent the internal surface 18a of the housing section 2a behind the rear end face 21a of the seal 11, i.e., behind the two annular beads 16, 17.

When the piston 5a assumes the operative position shown in the lower half of FIG. 3 (i.e., below the axis 10), a circumferential sealing action takes place between the internal surface 18a of the housing section 2a and the annular lip 20 of the seal 11 in a manner as already described hereinbefore with reference to the master cylinder 1 of FIG. 2. Additional (axial) sealing action takes place between the rear end face 21a of the seal 11 and the front end face of the control ring 34, and more specifically between such front end face and at least one of the annular beads 16, 17 (such as the bead 16). As can be seen in each of FIGS. 2 and 3, the bead 17 is located radially inwardly of the bead 16.

The conical face 35 of the control ring 34 cooperates with a complementary conical face 36 of the piston 5a to hold the control ring against undesired axial displacement with respect to the piston. The conical face 36 of the piston 5a is located radially inwardly of the conical surface 35 of the control ring 34. When in the idle position, the control ring 34 abuts a ring-shaped abutment or stop 37 (see the upper half of FIG. 3) which is held in a selected axial position between the housing sections 2a, 3a because it is received in a ring-shaped groove 38 defined by the housing sections 2a and 3a. The stop 37 is provided with an optional annular rearwardly extending supporting protuberance 39 which is received in a complementary groove provided in the front end face of the seal 4a.

The control ring 34 reaches and abuts the ring-shaped stop 37 before the piston 5a reaches the fully retracted position shown in the upper half of FIG. 3, namely before the rear end of this piston comes into abutment with the internal surface 40 of the rear end wall of the housing section 3a. When the control ring 34 reaches the stop 37, the piston 5a begins to move relative to the seal 11 and the carriage 12 so that the end face 21 of the piston ceases to sealingly engage the bead 17 of the seal 11. This establishes a path for the flow of hydraulic fluid from the chamber 7, through the thus obtained passage 41 between the end face 21 and the rear end face of the seal 11, through one or more radial ports 42 in the control ring 34 and into the conduit 9. Thus, when the piston 5a is fully retracted so that it abuts the internal surface 40, the pressure in the chamber 7 matches that in the conduit 9 and source 60. Such design of the master cylinder 1a renders it possible to dispense with the axially extending groove(s) 27 in the housing section 2 shown in FIG. 2. Under certain circumstances, the groove(s) 27 could accelerate the wear upon the seal 11.

FIG. 4 shows a master cylinder 1b wherein the seals 11 of the master cylinders 1 and 1a are replaced with a simpler washer-like seal 11b. The latter serves to seal the chamber 7 in the housing section 2b from the passage in the conduit 9 in the extended position of the piston 5b (see the lower half of FIG. 4). The seal 11b is in pronounced frictional engagement with the cylindrical external surface 33 of the piston 5b and is surrounded by the stop 37b which cooperates with the seal 4 in the same way as described in connection with the parts 4, 37 in the master cylinder 1a of FIG. 3. The seal 11b is bonded to or is in frictional or other suitable engagement with the stop 37b.

When the piston 5b is shifted in a direction toward the outlet 8 of the housing section 2b, it entrains the stop 37b which, in turn, entrains the seal 11b so that the latter seals the lower end 9b of the passage in the conduit 9, i.e., the source 60 of FIG. 1 is sealed from the chamber 7 in the housing section 2b. At the same time, the clearances or gaps 43, 44 (respectively provided in the seal 11b and the stop 37b) establish a path for the flow of hydraulic fluid between the chamber 7 and a compartment 45 defined by the seal 4 and the stop 37b. This automatically enhances the sealing action of the seal 11b at the adjacent inlet/outlet 9b of the conduit 9. The seal 4 seals the composite chamber including the chamber 7 in the housing section 2b, the compartment 45 between the parts 4, 37b, and the conduit(s) connecting the master cylinder 1b with the slave cylinder (see the conduits 58, 59 and the slave cylinder 52 shown in FIG. 1).

If the piston 5b of FIG. 4 is thereupon retracted, the seal 11a is withdrawn from the inlet/outlet 9b of the conduit 9 at a rate and to an extent depending upon the fluid pressure in the chamber 7 as well as upon the magnitude of friction between the seal 11b and the external surface 33 of the piston 5b. Thus, here again, the chamber 7 of the housing section 2b can be replenished with hydraulic fluid as a function of prevailing friction, the fluid being drawn from the source 60 and being supplied to the chamber 7 via conduit 9. Such phenomenon is even more pronounced in response to the development of subatmospheric pressure in the chamber 7 because the washer-like seal 11b is also acted upon by fluid at subatmospheric pressure.

In order to ensure an exchange of hydraulic fluid between the chamber 7 and the conduit 9, even in the event that the pressure of fluid in the chamber 7 is above atmospheric pressure while the master cylinder 1b is idle, the seal 11b is entrained by an external collar 46 at the front end of the piston 5b (corresponding to the rim 14 of the extension 13 of the piston 5 shown in FIG. 2) before the rear end of the piston reaches the internal surface 40 at the bottom end of the housing section 3b; this ensures that the inlet/outlet 9b is not blocked, i.e., that the fluid can flow between the interior of the conduit 9 and the chamber 7 in the housing section 2b.

An advantage of the master cylinder 1b is that its space requirements (as seen in the direction of the axis 10) are much less than those of the master cylinders 1 and 1a. This is due (at least in part) to the fact that the relatively bulky seals 11 in the master cylinders 1 and 1a are replaced with a flat washer-like seal 11b. Such flat washer-like seal suffices because it is merely called upon to seal the inlet/outlet 9b of the conduit 9. The chamber 7 in the housing section 2b is sealed by the seal 4 which latter performs the additional function of sealing the interior of the housing section 2b and the piston 5b from the surrounding atmosphere.

A feature of the improved cylinder and piston unit (such as the master cylinder 1 of FIG. 2) is that its housing (including the sections 2 and 3) is of one piece in the region where the chamber 7 can receive fluid from the source 60 (see the sections 2, 2a and 2b in the housings shown in FIGS. 2 to 4). This simplifies the sealing of the end portion (see, for example, the inlet/outlet 9b of the channel in the conduit 9 shown in FIG. 4) and renders the sealing (e.g., by the sealing elements 4 and 11b) less expensive in spite of its greater reliability. The sealing of the inlet/outlet 9b or of its equivalents in FIGS. 2 and 4 or in other embodiments of the improved cylinder and piston unit need not involve a welding, soldering or other bonding (such as glueing) operation, i.e., an operation which is costly and time consuming. The swivelling connection of the piston 5, 5a or 5b with the piston rod 6 can be established by semiskilled workers and the constituents (such as 5, 6, 11 and 12) of such connection can be made in machines which do not necessitate removal of surplus material from blanks (e.g., in lathes, grinders or analogous machines which are less likely to turn out long series of identical products).

If the piston is to be made of a thermosetting plastic material, one can start with a granulate (e.g., with particles in the form of tablets or with a preplasticized sausage which can be cold or slightly preheated and is introduced into a hot tool such as a shape-imparting implement or group of implements. It is also possible to employ an injection molding machine which receives thermosetting material from a plasticizer and injects the thus pretreated material into one or more cavities serving to impart to the injected material the shape of a piston (such as 5, 5a, 5b, etc.)

Transfer molding constitutes another suitable undertaking for the making of pistons and/or other parts which can be utilized in the improved master cylinders, slave cylinders or the like in accordance with our present invention. Thus, one can employ an injector piston which forces thermoplastic material through a plasticizing unit and, by way of an initial casting system, into the cavity or cavities which is or are designed to impart to its or their contents the shape(s) of piston(s).

Advantageous and presently preferred characteristic thermosetting materials can include melamine, phenolic resins, epoxy resins, silicon resins, unsaturated polyesters, urea and/or formaldehyde. Vyncolit G920 (registered trademark) is one of presently preferred thermosetting materials for the making of pistons and/or certain other constituents of the improved cylinder and piston units.

The above enumerated and other thermosetting materials can be reinforced and/or otherwise improved in a number of ways. For example, they can be reinforced to enhance their mechanical stability by resorting to strength-, durability-, hardness- and/or surface hardness enhancing characteristics. This can be achieved by resorting, for example, to organic and/or anorganic filaments such as glass fibers. Furthermore, the thermosetting material can be mixed with additives which enhance the surface smoothness (ability to slide) of the piston; this can be accomplished, for example, by admixing to the thermoseting plastic material suitable fluorocarbons such as Teflon (registered trademark), graphite or the like.

Still further, it is within the purview of this invention to make the piston by resorting to a shaping operation involving the use of at least two components, e.g., a first component which is a thermosetting substance and a second component which influences or determines the characteristics of the surface of the finished product (such as the piston 5, 5a and/or 5b). For example, the second component can influence or determine the surface hardness and/or the surface smoothness (ability to slide) of the piston relative to the housing (such as that including the sections 2, 3 or 2a, 3a or 2b, 3b). A presently preferred second component is a fluorocarbon.

The utilization of a thermosetting plastic material (e.g., with one or more reinforcing, surface smoothness enhancing and/or other additives) is of particular advantage when, in actual use, the surface of the piston is called upon to cooperate with the housing of a master cylinder or another cylinder and piston unit in order to provide a superior sealing action, to cooperate with the housing by exhibiting a superior guiding action (e.g., to be properly guided by the housing during movement to and/or from a first end position, one or more intermediate positions and/or a second end position). Thus, the piston should be capable of cooperating with one or more sections of the housing and/or with one or more discrete seals and/or with two or more different surfaces of a single seal or of two or more seals in order to prevent the escape of hydraulic fluid from the plenum chamber(s) of the housing. A piston made of a relatively soft material would be likely to undergo extensive wear and/or extensive deformation, even in response to the application of relatively low mechanical and/or other stresses and even in response to relatively short-lasting application of such stresses.

Furthermore, a piston made of any thermosetting (or other than thermosetting) material would be likely to undergo pronounced changes of its surface (e.g., the surface(s) would become rougher) after relatively short periods of use of a piston in the master cylinder and/or in the slave cylinder of a hydraulic system of the character shown in FIG. 1. This would adversely affect the reliability and the useful life of such system. Moreover, any reduction of the quality of the surface of the piston in the housing of a master cylinder and/or slave cylinder in the power train of a motor vehicle (e.g., in the brake actuating and/or in the friction clutch actuating unit) will result in damage to sealing lips if the piston is reinforced by glass fibers or the like because the fibers become exposed and cause mechanical damage to the elastic material of an annular or other sealing element. The tips of glass fibers are likely to extend from the surface of the piston and to rip, tear, scratch and otherwise damage the elastic material of a seal.

As already mentioned hereinbefore, a piston which is made (at least in part) of a thermosetting material exhibits the additional important advantage that, even though it is superior to a metallic piston, it can be made at a fraction of the cost of an acceptable massive metallic piston. This is of particular importance if the piston is to be mass produced in huge quantities, e.g., for use in the power trains of motor vehicles, and if each such power train employs two or more pistons and/or other parts which, if made at least in part of a thermosetting material, exhibit the aforediscussed desirable characteristics and other characteristics which will be discussed in the next-following passages of this specification.

It will be appreciated that a component made, at least in part, of a thermoplastic material exhibits numerous important advantages (such as lower cost, lesser wear ensuring longer useful life, less likelihood of damaging the neighboring part or parts and/or others) even if it is not the piston of a master cylinder. For example, the component can constitute the piston of a slave cylinder. Such slave cylinder can be installed adjacent the clutch bell to act upon the clutch release bearing by way of a clutch disengaging lever. Other slave cyinders which can employ pistons made at least in part of a thermsetting material can be disposed around the input shaft of the change-speed transmission.

In accordance with a further modification which is not shown in the drawing, the piston can be made of one piece with the piston rod. Pivotability of the piston rod relative to the clutch pedal or brake pedal can be achieved by assembling the piston with the housing of the cylinder and piston unit in such a way that the piston can perform angular movements (e.g., through up to 10°) relative to the axis of the housing. The piston and the housing of such piston and cylinder unit are preferably made of a thermosetting material and the seal between the piston and the housing can constitute a so-called channel ring or grooved ring or U-shaped ring.

The seal or seals between the piston and the housing of the cylinder and piston unit determines or determine those stages of operation of the unit during which the internal chamber of the housing communicates with the passage in the conduit 9, i.e., with the source 60. Such stages can be regulated by friction between the piston and the housing and/or between the piston and the seal(s) and/or between the housing and the seal(s). Alternatively, or in addition to such dependence upon friction, movements of the seal(s) relative to the piston and/or vice versa can be regulated as a function of the distance covered by the piston relative to the housing and/or in dependency upon changes of fluid pressure in the housing. When the unit is idle, the piston assumes or can assume an end position in which the hydraulic system is maintained at or close to atmospheric pressure and the piston cooperates with the housing to define therewith a chamber (such as a plenum chamber) having a maximum volume. A different condition is established when the cylinder and piston unit is in use (operative), namely when the piston is caused to move relative to the housing in a direction to reduce the volume of the chamber 7, i.e., to increase the pressure of fluid in the conduits 59, 58 and in the housing 52a of the slave cylinder 52.

A further situation is established during return movement of the piston 5, 5a or 5b to its starting position; this results in an increase of the volume of the chamber 7 and the slave cylinder 52 causes or enables the clutch 54 to assume the corresponding (such as engaged) condition. In accordance with a feature of the present invention, the master cylinder 1, 1a or 1b establishes a path for the flow of fluid between the chamber 7 and the source 60 at least during a certain stage of return movement of the piston 5 or 5a or 5b to its starting position. In the embodiments of FIGS. 2 and 3, the lip 20 of the seal 11 contacts the internal surface 18 or 18a of the housing section 2 or 2a whereas the beads 16, 17 engage the adjacent front end face 21 of the piston 5 or 5a. The seal 11 can be provided with a single bead 16 or 17, or with two or even more preferably coaxial beads. The provision of two (16, 17) or even more beads is often desirable because eventual inability of one of two or more beads to operate properly does not or need not affect the effectiveness of the other bead or beads. A bead is likely to be deactivated due to contamination and/or due to unanticipated excessive wear. It is clear that the beads 16, 17 and/or their equivalents can be provided only on the piston 5 or 5a or in part on such piston and in part on the seal 11 which is a so-called grooved or U-shaped ring. If the piston 5 or 5a is provided with one or more beads corresponding to the bead 16 and/or 17, such bead(s) can be provided during making of the piston; this renders it possible to employ a simpler and hence less expensive seal 11 which is devoid of beads and is merely provided with the lip 20 or its equivalent.

As already mentioned hereinbefore, frictional engagement between the lip 20 and the housing section 2 or 2a can be more pronounced than that between the carriage 12 and the extension 13 of the piston 5 or 5a. Therefore, the lip 20 initially holds the seal 11 against axial movement relative to the housing section 2 or 2a during the first stage of axial movement of the piston 5 or 5a from the retracted position (see the upper halves of FIGS. 2 and 3) toward its extended position (see the lower halves of FIGS. 2 and 3). This causes the beads 16, 17 to sealingly engage the front end face 21 of the piston 5 or 5a. As the piston 5 or 5a continues to move forwardly toward the position shown in the lower half of FIG. 2 or 3, it remains in engagement with the beads 16, 17 and thus seals the annular gap 5G. As the piston 5 or 5a continues to advance toward its front end position shown in the lower half of FIG. 2 or 3, the pressure of fluid in the chamber 7 rises and the beads 16, 17 are caused to engage the front end face 21 of the piston 5 or 5a with a progressively increasing force because, at such time, the source 60 is sealed from the chamber 7 but the volume of this chamber decreases. Thus, the sealing action between the piston 5 or 5a and the seal 11 increases with increasing pressure in the chamber 7.

It has been ascertained that it is advisable to establish and maintain a first friction torque between the lip 20 and the internal surface 18 or 18a of the housing section 2 or 2a, and a different second friction torque between te carriage 12 for the seal 11 and the extension 13 of the piston 5 or 5a. This ensures that the carriage 12 can move relative to the extension 13 to an extent which is determined by the stop 14 of the extension 13 and by the main portion of the piston 5 or 5a. The stop 14 can be replaced with other suitable means which limits or limit the extent of axial movement of the carriage 12 relative to the piston 5 or 5a in one direction. All that counts is to ensure that friction torque between the lip 20 and the housing section 2 or 2a preferably greatly exceed the friction torque between the parts 12 and 13, i.e., between the piston 5 or 5a and the seal 11.

When the piston 5 or 5a is being retracted from its front end position (see the lower halves of FIGS. 2 and 3) toward its rear end position, the lip 20 initially holds the seal 11 against movement relative to the housing section 2 or 2a while the piston 5 or 5a moves relative to the seal 11 to thus establish the gap 5G because the end face 21 of the piston moves away from the beads 16 and 17. Suction in the chamber 7 during such retraction of the piston 5 or 5a also contributes to the development of the gap 5G. This gap completes a path for the flow of fluid from the source 60, through the conduit 9 and into the chamber 7. In fact, suction in the chamber 7 draws fluid from the conduit 9 into the housing section 2 or 2a. In conventional master cylinders, only the suction in the chamber of the housing can induce the establishment of a path for the flow of fluid from the source into such chamber. On the other hand, the improved master cylinder renders it possible to establish a path for the flow of fluid from the source 60 into the housing of the master cylinder due to the novel selection of different frictional engagements between the seal and the housing on the one hand, and the seal and the piston (via carriage 12) on the other hand.

The path portion or gap 24 between the carriage 12 and the extension 13 of the piston 5 or 5a can be replaced with one or more channels or bores or grooves in the carriage and/or in the extension, or such additional path portion(s) can be provided in addition to the gap 24.

The provision of the relatively large or very large annular compartment (26) between the inlet/outlet 9a of the conduit 9 and the annular gap 5G exhibits the advantage that the pressure of the large quantity of fluid in the compartment can be maintained at a relatively low value so that the difference between the fluid pressure in the chamber 7 and that in the source 60 can be much smaller than in conventional master cylinders employing a source corresponding to that shown at 60 in the aforedescribed FIG. 1.

When the piston 5 or 5a is idle, the hydraulic fluid can flow between the chamber 7 and the source 60 independently of the friction-dependent establishment of gaps between the seal 11, the housing including the section 2 or 2a, and the piston 5 or 5a. If the pressure of fluid in the chamber 7 is above atmospheric pressure, and the piston 5 or 5a is idle in the extended position, the gap 5G is sealed because the beads 16, 17 bear upon the front end face 21. An alternative path for the flow of fluid between the chamber 7 and the source 60 is established by the groove or grooves 27 which are adjacent the seal 11 when the piston 5 is maintained in the retracted position (see the upper half of FIG. 2).

The establishment of the gap 5G in the retracted position of the piston 5a exhibits the additional advantage that, by employing the control ring 34 which can abut the piston 5a at 35, 36 and has limited freedom of axial movement relative to this piston, the bead 16 of the seal 11 engages the control ring 34 and the bead 17 engages the adjacent front end face of the piston 5a. Such arrangement renders it possible to achieve a friction-regulated sealing action. The stop 37 arrests the control ring 34 before the piston 5a reaches the fully retracted position shown in the upper half of FIG. 3. This separately produced stop 37 can be omitted if an equivalent stop is provided on the housing including the sections 2a and 3a. The illustrated stop 37 can be provided with one, two or more ports 42 for the flow of fluid between the passage 41 and the interior of the conduit 9. Such port or ports 42 ensure that the pressure in the chamber 7 of the housing section 2a matches the pressure of fluid in the source 60 when the piston 5a dwells in the retracted position.

The aforediscussed feature of making the extension 13 of the piston 5 or 5a deformable (by the provision of axially parallel slots therein) so that the carriage 12 can be slipped onto it (i.e., over the conical external surface 15 of the border 14) can be resorted to jointly with a slotted carriage which can be expanded during assembly with the extension 13. The just discussed slot of the carriage 12 and/or the slots of the extension 13 contribute to establishment of the clearance 24 for the flow of hydraulic fluid between the chamber 7 and the interior of the conduit 9 when the establishment of a path for such flow is required or desirable.

Referring again to FIG. 4, the flat washer-like seal 11b can be provided with an internal bead or ring 11c which is in sealing engagement with the external surface of the piston 5b, at least when the latter assumes the retracted position shown in the upper half of FIG. 4. Frictional engagement between the seal 11b and the piston 5b can be sufficiently pronounced to ensure that the piston 5b entrains the seal 11b from the axial position shown in the upper part to that shown in the lower part of FIG. 4. This ensures that the advancing piston 5b forces the seal 11b against the inlet/outlet 9b and seals the interior of the conduit 9 from the chamber 7 of the housing section 2b while the piston expels fluid from the chamber 7, through the outlet 8 and into the conduit 59 shown in FIG. 1. The abutment 37b then assists the piston 5b in urging the seal 11b against the inlet/outlet 9b of the conduit 9. The abutment 37b is preferred but optional, i.e., the peripheral surface of the seal 11b can be maintained in direct frictional engagement with the internal surface of the housing section 2b. The extent or magnitude of frictional engagement between the abutment 37b and the housing section 2b is less pronounced than that between the seal 11b and the piston 5b.

It will be noted that the outer diameter of the seal 11b exceeds the diameter of the chamber 7 in the housing section 2b of the master cylinder 1b shown in FIG. 4. The inlet/outlet 9b of the conduit 9 shown in FIG. 4 is located between the internal and external surfaces of the seal 11b (as seen in the radial direction of the housing section 2b). The collar 46 of the piston 5b moves the seal 11b axially and away from the inlet/outlet 9b during the last stage of retraction of the piston to the position shown in the upper half of FIG. 4, and friction between the seal 11b and the piston causes the seal to interrupt the flow of fluid from the inlet/outlet 9b into the chamber 7 during the major part of forward movement of the piston, i.e., when the collar 46 is spaced apart from the seal 11b. The pressure in the compartment 45 rises during forward movement of the piston 5b, and this ensures even more reliable sealing of the inlet/outlet 9b from the chamber 7 while the piston expels hydraulic fluid from the chamber 7 via outlet 8 of the housing section 2b.

It will be appreciated that the maker of the improved hydraulic system can select the various friction torques, the timing of establishment of the path(s) for the flow of fluid between the conduit 9 and the chamber 7, the pressure of fluid in the chamber 7 during expulsion of fluid into the conduit 59, the quantity of fluid issuing from the housing section 2, 2a or 2b via outlet 8, as well as numerous other parameters in dependency upon the exact nature of the power train or another arrangement in which the improved cylinder and piston unit is being put to use.

FIGS. 5 to 13 illustrate several embodiments of ball-and-socket connections or joints between the pistons and piston rods which can be utilized in the improved master cylinder, slave cylinder or practically any other cylinder wherein a reciprocable piston can receive motion from and/or transmit motion to a driving or driven part by way of a piston rod.

Figure 5:
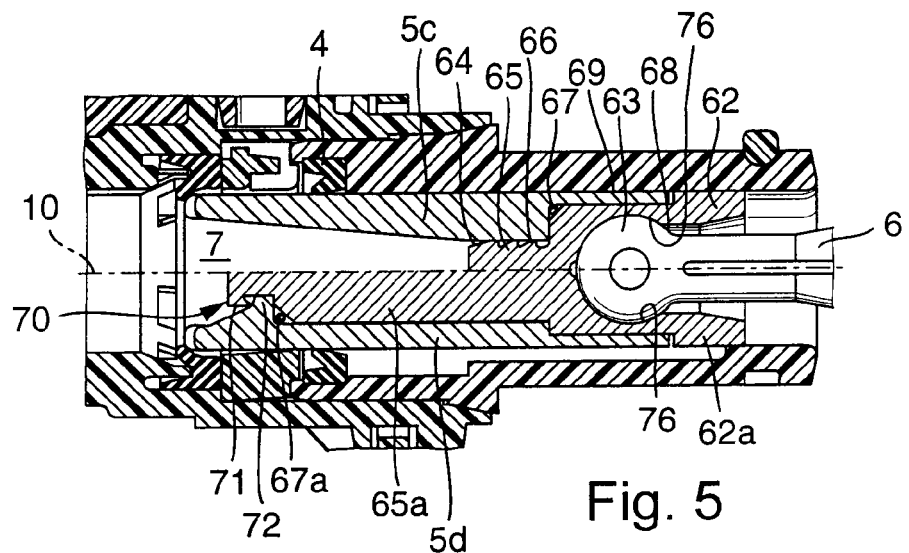
FIG. 5 is a fragmentary elevational view of a piston rod and two embodiments of a connector which couples the spherical head of the piston rod to a first piston installed in the housing of a first master cylinder shown in the upper half and to a second piston in the housing of a second master cylinder shown in the lower half of the Figure.

As can be seen in FIG. 5, the construction of the ball-and-socket connection or joint (hereinafter often called joint for short) between a piston 5c (shown in the upper half of this Figure) or 5b (shown in the lower part) and the piston rod 6 is such that the piston rod shares the movements of the piston 5c or 5d in the direction of the axis 10 but that the piston rod is free to swivel relative to the piston 5c or 5d about an axis which intersects the axis 10, e.g., which is normal to the axis 10.

The character 63 denotes the spherical body or head or dome (hereinafter called head) forming part of the piston rod 6 and received in the complementary socket 76 of an elastic connector 62 fitted into the piston 5c in such a way that the connector cannot be accidentally separated from the piston rod 6 and/or from the piston 5c. The latter has an axial passage 64 which receives a plug-shaped extension 65 of the connector 62. The exterior of the extension 65 is profiled radially of the axis 10; the illustrated extension 65 has several coaxial and axially spaced apart rings 66 which contact the adjacent portions of the internal surface of the piston 5c. The rings 66 can extend into complementary internal grooves of the piston 5c or they engage the internal surface of this piston solely by friction but with a sufficient force to prevent unintentional axial shifting of the piston 5c and the connector 62 relative to each other. The internal surface of the piston 5c can be slightly undercut in a sense to enhance the engagement with the rings 66 of the connector 62. It is also possible to replace the rings 66 with an external thread which mates with an internal thread of the piston 5c. If the parts 62 and 5c are threadedly connected to each other, such connection can be self-locking or can include a lock adapted to prevent accidental (unintentional) separation of the parts 5c, 62 or accidental axial shifting of such parts relative to each other.

The piston 5c is open toward the plenum chamber 7 of the master cylinder and contains an annular seal 67 which engages the external surface of the connector 62 to prevent escape of hydraulic fluid from the chamber 7 toward the piston rod 6. The illustrated seal 67 is constructed and installed to furnish a radial as well as axial sealing action. However, it is also possible to employ a two-piece connector in lieu of the illustrated one-piece connector 62 and to replace the prefabricated seal 67 with a sealing material such as caoutchouc, NBR, a macroscopic connection (glue) and/or a microscopic connection. The seal (at 67) can be established during making of the part 5c and/or 62, e.g., in an injection molding machine.

The assembly of the piston 5c with the piston rod 6 can be carried out in such a way that the connector 62 is assembled with the piston 5c in a first step; this can involve a snapping of the spherical head 63 into the socket 76 by overcoming the resistance of the undercut 68 of the connector 62, i.e., by forcibly expanding the connector at 68. To this end, the plastic material of the connector 62 can exhibit a certain elasticity. Alternatively, the connector 62 can be relatively thin (and hence more readily expandible) in the region (at 68) which must expand, at least slightly, in order to permit the spherical head 63 to snap into the socket 76 of the connector 62.

In order to effect a radial stabilization of the connector 62 at the undercut 68, as well as to lengthen the axial guide surface of the piston 5c, the latter can be provided with a sleeve-like formation 69 which surrounds the undercut 68 and which can serve the additional purpose of prolonging the axial guide surface of the piston in the housing or cylinder of the master cylinder or another cylinder embodying the structure shown in the upper half of FIG. 5.

Alternatively, or in addition to the just described undertakings, the connector 62 can be provided with an annular array of elongated slots or grooves in or close to the region of the undercut 68 to thus enhance the resiliency or yieldability of the connector at 68 and ensure that the spherical head 63 can be forced into the socket 76 of the connector in response to the exertion of a relatively small force.

The combination including the piston rod 6 and the connector 62 is assembled with the seal 67 prior to being introduced into the axial sleeve-like formation 69 of the piston 5c. The plug 65 of the connector 62 enters the profiled passage 64 of the piston 5c so that it is a tight radial fit in the formation 69 to thus guarantee a pronounced resistance to axial movement(s) of the piston 5c and the connector 62 relative to each other. Once the parts 5c and 62 are properly assembled, the sleeve-like formation 69 of the piston holds the surrounded portion of the connector against radial expansion so that the undercut portion 68 of the connector is held against movement away from the spherical head 63 of the piston rod 6, i.e., the head 63 cannot be extracted from the socket 76. This is important during return movement of the clutch pedal 61 to its retracted (non-depressed) position under the action of a spring or the like, i.e., the pedal 61 cannot extract the head 63 of the piston rod 6 from the socket 76 of the connector 62

The piston 5d which is shown in the lower half of FIG. 5 receives the major portion of a modified connector 62a having a socket 76a for the spherical head 63 of a piston rod 6 which is or can be identical with the piston rod 6 cooperating with the connector 62 in the piston 5c. A difference between the structures which are shown in the upper and lower halves of FIG. 5 is that the front end portion of the connector 62a extends close to and is connected with the front (left-hand) end portion of the piston 5d, whereas the plug 65 constituting the front end portion of the connector 62 is attached to a median portion of the piston 5c (namely to that portion of the piston 5c which is located close to the head 63 of the piston rod 6.

The axial forward extension or plug 65a of the connector 62a between the piston rod 6 and the piston 5d constitutes or can constitute the major part of this connector and carries one part of a snap fastener 70 which is designed to reliably but still separably couple the front end portion of the connector 62a with the front end portion of the piston 5d. The snap fastener 70 includes first fastening elements or claws 71 provided on the extension 65a and a second fastening element 72 in the form of an internal ring provided on the piston 5d and engaged by the free end portions of the claws 71. A sealing element 67a is provided adjacent the ring 72 to prevent the flow of hydraulic fluid from the chamber 7 into that portion of the piston 5d which surrounds the extension 65a of the connector 62a.

The exact nature of the housings of the cylinders respectively shown in the upper and lower halves of FIG. 5 can but need not depart (or significantly depart) from those described with reference to and shown in FIGS. 2, 3 and 4.

The radial profile 66 of the plug 65 shown in the upper half of FIG. 5 can include two or more rings having different outer diameters so that each such ring engages the internal surface of the piston 5c with a different force. The difference between the inner diameter of the piston 5c at 64 and the outer diameter(s) of one or more rings at the profile 66 prior to insertion of the plug 65 into the opening 64 can be sufficiently large to ensure a pronounced deformation of one or more rings so that such ring or rings is or are wedged into the piston 5c. An advantage of a threaded connection between the piston 5c and the plug 65 is that the latter can be introduced into the piston with the exertion of a relatively small force.

Figure 6:
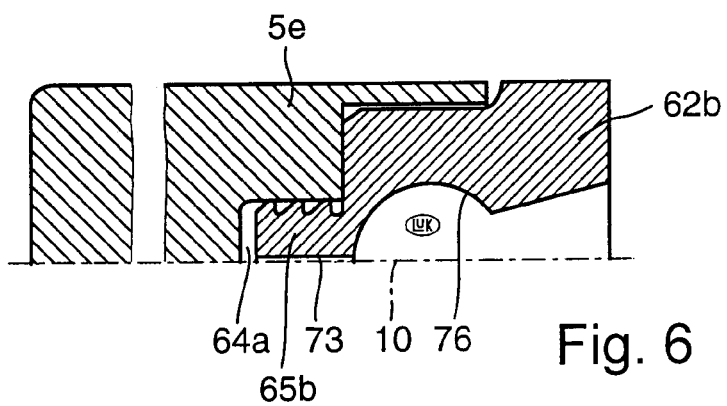
FIG. 6 is a fragmentary axial sectional view of a coupling between a piston and a connector which departs from the couplings shown in the upper and lower halves of FIG. 5.

FIG. 6 illustrates a modification of a connection, combination or joint including a piston 5e and a connector 62b. The piston 5e is a closed piston in contrast to those shown (at 5c and 5d) in FIG. 5. The median portion of the piston 5e is broken away and FIG. 6 shows only that part of this piston which is disposed at one side of a plane including the common axis 10 of the parts 5e, 62b and the non-illustrated seals and housing of the master cylinder. In order to avoid entrapment of air in the opening 64a between the piston 5e and the connector 62b in the region of the socket 76 for the (non-illustrated) spherical head of the piston rod (e.g., a piston rod of the type shown at 6 in FIG. 5) during introduction of the axial extension or plug 65b of the connector 62b into the opening 64a of the piston 5e (i.e., in order to simplify the assembly of the parts 5e and 62b with each other), the connector 62b is provided with an air evacuating passage 73 leading from the opening 64a into the socket 76 for the spherical head of the piston rod.

The structure which includes the parts shown in in FIG. 6 can be modified by providing the spherical head which is received in the socket 76 of the connector 62b (and corresponds to the head 63 shown in FIG. 5) with at least one opening corresponding to the passage 73 to facilitate the expulsion of air from the socket 76 while the latter is in the process of receiving the spherical head of the piston rod. Alternatively, the just mentioned at least one opening in the spherical head of the piston rod can be omitted, i.e., the maker of the improved master cylinder or another cylinder embodying the structure shown in FIG. 6 can rely on unavoidable gap or gaps between the concave surface bounding the socket 76 and the convex surface bounding the spherical head of the piston rod. In fact, at least one of such convex and concave surfaces can be intentionally deformed to an extent which suffices to guarantee the escape of air from the socket 76 during introduction of the spherical part of the piston rod.

Figure 7:
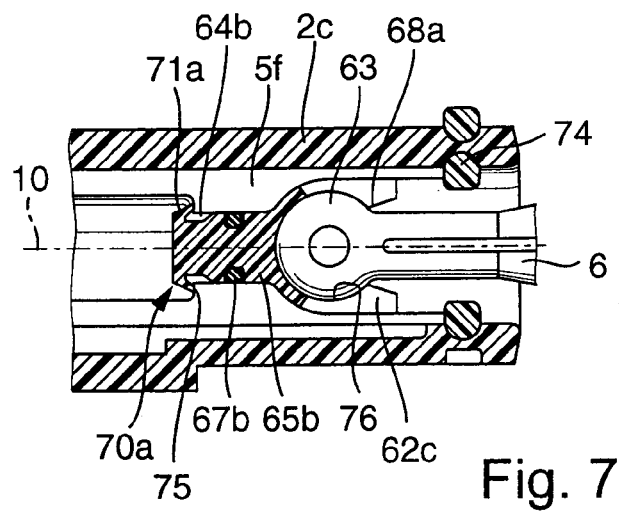
FIG. 7 is a fragmentary axial sectional view of a master cylinder employing a further connector between the spherical or domed end portion of the piston rod and the piston in the housing of the master cylinder.

FIG. 7 shows a portion of a plastic housing section 2c forming part of a further master cylinder or an analogous cylinder preferably employing a piston 5f consisting at least in part of a thermosetting plastic material and preferably made in an injection molding machine. The piston 5f is movable in the housing section 2c forwardly and backwards in the directions of the axis 10 and to an extent determined by suitable arresting means or stop means. The means for articulately coupling the piston 5f to the spherical head 63 of a swivelling piston rod 6 includes a connector 62c having a socket 76 for the spherical head 63.

The connector 62c is coupled to the piston 5f by a snap fastener 70a. To this end, the axial extension or plug 65b of the connector 62c in the central opening 64b of the piston 5f is provided with radially outwardly extending hook-shaped male fastening members 71a engaging a ring-shaped fastening member 75 of the piston 5f. The fastening member 75 is adjacent the opening 64b. During introduction of the extension 65b into the piston 5f, the male fastening members 71a are flexed to lie at least partially flush against the periphery or extension or plug 65b and thereupon snap back (outwardly) to the positions shown in FIG. 7 so that they cooperate with the ring-shaped fastening member 75 of the piston 5f and thus prevent unintentional extraction of the connector from the piston.

The piston 5f is open in a direction toward the chamber of the housing of the master cylinder embodying the structure of FIG. 7, and a ring-shaped seal 67b is installed between this piston and the connector 62c in the region of the opening 64b. Prior to introduction of the connector 62c into the piston 5f, the spherical head (63) of the piston rod 6 (see FIG. 5) is inserted into the socket 76 of the connector 62c by snap action. Such insertion can be facilitated by providing the undercut portion 68a of the connector 62c with axially parallel slits (not shown) to thus ensure that the insertion of the head 63 into the socket 76 necessitates the exertion of a relatively small force. When the undercut portion 68a is thereupon received in the cylindrical rear end portion of the piston 5f, the latter prevents an expansion of such undercut portion, i.e., the spherical head 63 is reliably held in its socket 76 so that the connector 62c is compelled to share all axial movements of the piston 5f and vice versa. The character 74 denotes an annular stop which is anchored in the plastic section 2c and limits the extent of rearward movement of the connector 62c and piston 5f relative to the housing including the section 2c.

FIG. 8 illustrates a different mode of articulately connecting the spherical head 63 of a piston rod 6 with one end portion of a solid piston 5g which is reciprocable in the housing (not shown) of a master cylinder or the like. The head 63 is compelled to share all (axial) movements of the piston 5g in the direction of the axis 10 but can turn relative to the piston about axes which intersect the axis 10. The piston 5g is or can be made of a thermosetting material, and the end face of its illustrated end portion is provided with one-half or even less than one-half of a concave socket 76 for the head 63. The connector which secures the head 63 in the socket 76 is or includes a cover, cap or lid 77 having a central opening 81 (see FIG. 9) large enough to permit the necessary swiveling of the piston rod 6 relative to the adjacent end portion of the piston 5g.

The illustrated end portion of the piston 5g is provided with a cylindrical axially and outwardly extending sleeve 78 having a radially outwardly extending rim 79 which is engaged, preferably by snap action, by radially inwardly extending prongs (not referenced) of the connector or lid 77. Alternatively, the connector 77 can be simply pushed axially downwardly (as seen in FIG. 8) until its prongs properly engage the rim 79 of the sleeve 78 on the piston 5g. Temporary expansion of the connector 77 during assembly with the piston 5g is made possible due to a special design of the connector. One presently preferred design can be seen in FIG. 9 which shows that the connector 77 has a radial wedge-shaped recess 80 which communicates with the central opening 81. The latter further communicates with an annular array of relatively short radial slots 82 which contribute to the ability of the radially extending wall of the connector 77 to expand during attachment to the portions 78, 79 of the piston 5g. The diameter of the central opening 81 of the connector 77 matches or slightly exceeds the diameter of that portion of the piston rod 6 where its elongated central portion merges into the spherical head 63.

The tongues or flaps 83 between the slits 82 of the connector or lid 77 are or can be elastic (flexible) in the direction of the axis 10 so that the shapes of such tongues or flaps can conform to the shape of the adjacent portion of the spherical head 63 in the socket 76 of the piston 5g. Such arrangement enables the tongues or flaps 83 to bias the spherical head 63 against the concave surface bounding the socket 76 of the piston 5g. Thus, the flaps 83 can replace screws, bolts or analogous discrete separately produced fasteners with attendant savings in the overall cost of the cylinder and assembly time and cost of the structure shown in FIGS. 8 and 9.

The piston 5h which is shown in FIG. 10 is coupled with the piston rod 6 in such a way that the shank of the piston rod can swivel relative to but the spherical head 63 is compelled to share the movements of the piston in the direction of the axis 10. The connector comprises an annular array of discrete segments or parts 76a which define and bound a concave socket 76 for the head 63. Those (elastic) portions of the segments or parts 76a which merge into the major part of the piston 5h are configurated in such a way that they can yield radially outwardly to an extent which is necessary in order to allow for introduction of the head 63 into the socket 76, i.e., the elastic portions of the segments 76a permit the head 63 to advance through the normally narrowest (undercut) portion 68b of the path leading into the socket 76.

Once the spherical head 63 is properly received in the socket 76, a ring-shaped retainer 84 is slipped around the segments 76a so that they cannot move apart and thus securely hold the head in the socket. The retainer 84 can be held in the illustrated operative (expansion preventing) position by friction and/or by other form(s) of self-locking action and/or by resorting to suitable fasteners. As shown, the retainer 84 (which is preferably made of a suitable plastic material) can be provided with radially inwardly extending projections 85 which engage and are held by the adjacent segments 76a. It is also possible to employ a metallic retainer which is frictionally held by or is positively affixed (e.g., bonded or bolted or screwed) to the segments 76a.

FIG. 11 shows a portion of a piston 5i one end face of which is provided with a socket 76 for the spherical head of a piston rod, not shown (e.g., a piston rod of the type illustrated at 6 in FIG. 8 or 10). The piston 5i can be put to use when it is not required to pull the piston rod axially or vice versa. It is then merely necessary to prevent accidental separation of the piston 5i from the piston rod. Such arrangement contributes to simplicity and lower cost of the cylinder or system which embodies the present invention because it allows for a reduction of the overall number of discrete parts (such as the aforediscussed connectors). The accidental separation preventing means includes an annular array of protuberances or projections 86 (see also FIG. 12) provided at the recessed axial end of the piston 5i and extending into the (axially) outermost part of the socket 76. The protuberances 86 snap behind the properly introduced spherical head 63 of a piston rod 6 (not shown in FIGS. 11 and 12) and hold such head against unintentional extraction from the socket 76. The elasticity of the material of the piston 5i and/or of the spherical head is or can be selected in such a way that the protuberances 86 and/or the head can temporarily yield during forcible introduction of the head into the socket; the head and/or the protuberances thereupon reassumes or reassume its or their original shape or shapes to thus retain the spherical head in its socket.

FIG. 12 illustrates six equidistant protuberances 86. It is clear that such number can be increased or reduced (and that the shapes of the protuberances can be altered) without departing from the spirit of the present invention. Thus, the number of protuberances 86 or their equivalents can be less than or can exceed six, and all protuberances need not be identical.

FIG. 13 depicts a modified piston 5j with a socket 76 having an inlet bounded by three circumferentially extending elongated protuberances or projections 87. The configurations of these protuberances are complementary to those of the adjacent portions of the spherical head of a piston rod which is to be articulately connected with the piston 5j. The functions of the protuberances 87 are or can be identical with those of the protuberances 86 shown in FIGS. 11 and 12.

Referring again to FIG. 5, the structure which is shown in the lower half of this Figure can be modified by providing the hollow piston 5d with an axial bore or hole having two or more different diameters which increase stepwise in a direction toward the open end of the piston and by providing such piston with two or more axially spaced apart arrays of claws 71 or the like. Each array of claws engages a different annular external ring (72) of the plug 65a.

The retainer 84 of FIG. 10 can be glued to or can be a tight fit on the segments 76a.

All or nearly all embodiments of the improved cylinder and piston unit can employ energy storing elements which operate axially between the housing and the piston. For example, one can provide a servo spring. It is often advisable to utilize a so-called over-the-dead-center- or snapower spring which can compensate for changes of the force exerted by the friction clutch. Furthermore, one can employ servo springs for the purpose of resetting the piston to its starting or retracted position; this renders it possible to dispense with customary energy storing elements which urge the pedal 61 of FIG. 1 or an equivalent thereof (e.g., an actuator) to its starting position.

Referring, for example, again to FIG. 2, a coil spring can be utilized in the chamber 7 to bear upon the front end of the piston 5 and to react against the internal surface of the housing section 2 at the outlet 8 to thus urge the piston to the retracted position shown in the upper half of FIG. 2. The piston 5 can be provided with a specially designed platform or the like to serve as an abutment for the respective end convolution of such coil spring. The chamber 7 can be provided with guide means for the intermediate convolutions of such spring. Alternatively, or in addition to a single coil spring, the chamber 7 can contain two or more springs which are fitted into each other so as to enhance the ability of the thus obtained composite spring to stand buckling stresses which tend to move the intermediate convolutions of the spring or springs sideways.

Experiments indicate that at least two interfitted coil springs can stand buckling stresses which are a multiple of those effectively opposed by a single coil spring.

It was further ascertained that the ability of plural coil springs to effectively withstand buckling and/or other undesirable deformations is greatly enhanced if such discrete coil springs have different wire diameters and/or different numbers of convolutions and/or convolutions with different pitches or slopes. For example, if the chamber 7 contains two interfitted coil springs, the outer spring can be convoluted in a clockwise direction and the inner spring can be convoluted in a counterclockwise direction, or vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydraulic operating systems, such as for friction clutches and the like and, therefore, such adaptations should and are intended to be comprehended within the meaning and range of equivalence of the appended claims.

What is claimed is:

1. A variable-condition hydraulic system, comprising: a master cylinder including a first housing and a first piston reciprocable in and defining with a section of said housing a first fluid-containing chamber; a slave cylinder including a second housing and a second piston reciprocable in and defining with said second housing a second fluid-containing chamber; at least one hydraulic connection between said chambers; a source of hydraulic fluid; at least one conduit arranged to connect said source with said first chamber; and a seal interposed between said first piston and an internal surface of said section of said first housing, said seal being movable within limits relative to said first piston between a plurality of positions in dependency upon the condition of the system, wherein said first piston has an axial extension and said seal is axially movably mounted on said extension, the seal coupled to a carriage that shares the movements of the seal, wherein friction ratios between friction partners (a) said internal surface of said section and an annular lip at a front axial end of the seal and (b) an external surface of said axial extension and an internal surface of the carriage are established such that in any case the friction between said sealing lip and said internal surface of said first housing is greater than the friction between said carriage and said axial extension, wherein the axial extension includes a flange at its free end that extends radially outward so as to form a ring flange, whereby a fastening of the carriage is facilitated, wherein the carriage is longitudinally slotted to provide a snap connection with the ring flange.

2. A variable-condition hydraulic system, comprising: a master cylinder including a first housing and a first piston reciprocable in and defining with a section of said housing a first fluid-containing chamber; a slave cylinder including a second housing and a second piston reciprocable in and defining with said second housing a second fluid-containing chamber; at least one hydraulic connection between said chambers; a source of hydraulic fluid; at least one conduit arranged to connect said source with said first chamber; and a seal interposed between said first piston and an internal surface of said section of said first housing, said seal being movable within limits relative to said first piston between a plurality of positions in dependency upon the condition of the system, wherein said first piston has an axial extension and said seal is axially movably mounted on said extension, the seal coupled to a carriage that shares the movements of the seal, wherein friction ratios between friction partners (a) said internal surface of said section and an annular lip at a front axial end of the seal and (b) an external surface of said axial extension and an internal surface of the carriage are established such that in any case the friction between said sealing lip and said internal surface of said first housing is greater than the friction between said carriage and said axial extension, wherein the axial extension includes a flange at its free end that extends radially outward so as to from a ring flange, whereby a fastening of the carriage is facilitated, wherein the fastening comprises a snap fit mount.

3. The hydraulic system of claim 2, wherein said first piston is movable relative to said section of said first housing to an idle position in which said source communicates with said first chamber by way of said at least one conduit.

4. The hydraulic system of claim 3, wherein said section is provided with at least one channel which establishes at least a portion of a path for the flow of fluid between said at least one conduit and said first chamber in an end position of said seal and while said first piston is idle.

5. The hydraulic system of claim 4, wherein said section of said first housing has an internal surface surrounding said first piston and said seal, said at least one channel including a groove provided in said internal surface.

6. The hydraulic system of claim 4, further comprising a control ring axially movably interposed between said first piston and said first housing and having at least one opening defining a second portion of said path in a predetermined axial position relative to said section.

7. The hydraulic system of claim 6, further comprising a stop provided in said first housing and arranged to arrest said control ring in said predetermined axial position relative to said section.

8. The hydraulic system of claim 2, wherein said seal is arranged to normally seal said at least one conduit from said first chamber and to establish a path for the flow of fluid between said at least one conduit and said first chamber in response to movement to at least one of said plurality of positions, said seal being movable at least in part by said first piston and assuming said at least one position in response to assumption by said first piston of an end position relative to said first housing.

9. The hydraulic system of claim 2, wherein at east a portion of at least one of said pistons consists, at least in part, of a thermosetting plastic material.

10. The hydraulic system of claim 2, further comprising means for reciprocating one of said pistons relative to the respective housing, said reciprocating means including a ball and socket joint.

11. The hydraulic system of claim 2, wherein said seal is mounted on its inner circumference to said carriage that can be displaced against the first piston to a degree that is limited axially.

12. The hydraulic system of claim 2, wherein said seal is arranged to establish communication between said at least conduit and said first chamber in at least one predetermined position of said seal relative to said first piston.

13. The hydraulic system of claim 12, wherein said seal is movable to said at least one predetermined position as a result of an abutment between the seal and a flange formed at a front end of said extension said first piston.

14. The hydraulic system of claim 13, wherein said first piston is movable relative to said section of said first housing through a predetermined distance from an end position and said at least one seal is arranged to share a predetermined stage of movement of said first piston.

15. The hydraulic system of claim 2, wherein said seal is movable relative to said first piston in response to changes of fluid pressure in said first chamber.

16. The hydraulic system of claim 2, wherein said seal is arranged to establish with at least one of said first piston and said first housing at least one path for the flow of fluid between said at least one conduit and said first chamber in at least one of said plurality of positions of said seal relative to said first piston.

17. The hydraulic system of claim 2, wherein said first piston has an end face, said seal having a first surface in at least temporary sealing engagement with said end face and a second surface in at least temporary sealing engagement with said internal surface of said section of said first housing.

18. The hydraulic system of claim 17, wherein said first surface of said seal has at least one annular projection movable into and from sealing engagement with said end face of said first piston.

19. The hydraulic system of claim 2, further comprising a control ring movably interposed between said first piston and said first housing, said seal having a first annular projection arranged to sealingly engage an annular end face of said first piston and a second annular projection surrounding said first annular projection and arranged to sealingly engage an end face of said control ring.

20. The hydraulic system of claim 2, wherein said first piston is reciprocable in said section of said first housing to increase and reduce the pressure of fluid in said first chamber, said seal being arranged to seal said first chamber from said at least one conduit in response to an increase of fluid pressure in said first chamber.

21. The hydraulic system of claim 20, wherein said seal is further arranged to intensify the sealing action between said at least one conduit and said first chamber in response to increasing fluid pressure in said first chamber.

22. The hydraulic system of claim 20, wherein said seal is arranged to move relative to said first piston in response to movement of said first piston in a direction to reduce the fluid pressure in said first chamber.

23. The hydraulic system of claim 2, wherein said at least one conduit has an inlet/outlet at said section of said first housing and said seal is arranged to directly seal said inlet/outlet in at least one of said plurality of positions.

24. The hydraulic system of claim 2, wherein said carriage is surrounded by said seal, said carriage axially movably surrounding said extension of said first piston.

25. The hydraulic system of claim 24, wherein said extension has a radially outwardly extending stop arranged to limit the extent of movability of said carriage relative to said first piston.

26. The hydraulic system of claim 25, wherein said carriage is mounted on said extension as a result of movement over the stop of said extension and said stop has a substantially conical surface arranged to facilitate the mounting of said carriage on said extension.

27. A variable-condition hydraulic system, comprising: a master cylinder including a first housing and a first piston reciprocable in and defining with a section of said housing a first fluid-containing chamber; a slave cylinder including a second housing and a second piston reciprocable in and defining with said second housing a second fluid-containing chamber; at least one hydraulic connection between said chambers; a source of hydraulic fluid; at least one conduit arranged to connect said source with said first chamber; and a seal interposed between said first piston and an internal surface of said section of said first housing, said seal being movable within limits relative to said first piston between a plurality of positions in dependency upon the condition of the system, wherein said first piston has an axial extension and said seal is axially movably mounted on said extension, the seal coupled to a carriage that shares the movements of the seal, wherein friction ratios between friction partners (a) said internal surface of said section and an annular lip at a front axial end of the seal and (b) an external surface of said axial extension and an internal surface of the carriage are established such that in any case the friction between said sealing lip and said internal surface of said first housing is greater than the friction between said carriage and said axial extension, wherein the carriage is surrounded by said seal, said carriage axially movably surrounding said extension of said first piston, wherein said extension is tubular and has at least one elongated slot to permit radial contraction during mounting of said carriage on said extension.

28. A variable-condition hydraulic system, comprising: a master cylinder including a first housing and a first piston reciprocable in and defining with a section of said housing a first fluid-containing chamber; a slave cylinder including a second housing and a second piston reciprocable in and defining with said second housing a second fluid-containing chamber; at least one hydraulic connection between said chambers; a source of hydraulic fluid; at least one conduit arranged to connect said source with said first chamber; and a seal interposed between said first piston and an internal surface of said section of said first housing, said seal being movable within limits relative to said first piston between a plurality of positions in dependency upon the condition of the system, wherein said first piston has an axial extension and said seal is axially movably mounted on said extension, the seal coupled to a carriage that shares the movements of the seal, wherein friction ratios between friction partners (a) said internal surface of said section and an annular lip at a front axial end of the seal and (b) an external surface of said axial extension and an internal surface of the carriage are established such that in any case the friction between said sealing lip and said internal surface of said first housing is greater than the friction between said carriage and said axial extension, wherein the carriage is surrounded by said seal, said carriage axially movably surrounding said extension of said first piston, wherein said carriage is a tube having a slot arranged to permit radial expansion of the carriage during mounting on said extension.

* * * * *